United States Patent
Park et al.

(10) Patent No.: US 10,325,454 B2
(45) Date of Patent: Jun. 18, 2019

(54) METHOD FOR PROVIDING NOTIFICATION AND ELECTRONIC DEVICE THEREOF

(71) Applicant: SAMSUNG ELECTRONICS CO., LTD., Suwon-si, Gyeonggi-do (KR)

(72) Inventors: Junhyung Park, Seoul (KR); Nojoon Park, Seongnam-si (KR); Hyojung Lee, Goyang-si (KR); Taehee Lee, Seongnam-si (KR); Geon-Soo Kim, Suwon-si (KR); Han-Jib Kim, Suwon-si (KR); Yongjoon Jeon, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/888,394

(22) Filed: Feb. 5, 2018

(65) Prior Publication Data

US 2018/0225933 A1    Aug. 9, 2018

(30) Foreign Application Priority Data

Feb. 3, 2017   (KR) .................. 10-2017-0015619

(51) Int. Cl.
*G08B 3/10*        (2006.01)
*H04L 12/58*       (2006.01)
*H04R 1/02*        (2006.01)
*H04R 3/00*        (2006.01)
(Continued)

(52) U.S. Cl.
CPC .......... *G08B 3/1016* (2013.01); *H04L 51/12* (2013.01); *H04L 51/24* (2013.01); *H04L 51/38* (2013.01);
(Continued)

(58) Field of Classification Search
None
See application file for complete search history.

(56) References Cited

U.S. PATENT DOCUMENTS

| | | | |
|---|---|---|---|
| 7,388,886 B2 | 6/2008 | Perkins et al. | |
| 9,338,235 B2 * | 5/2016 | Park .................. | H04L 67/12 |

(Continued)

FOREIGN PATENT DOCUMENTS

| | | |
|---|---|---|
| JP | 2015-153379 | 8/2015 |
| JP | 2015-194803 | 11/2015 |

(Continued)

OTHER PUBLICATIONS

European Search Report dated Jun. 1, 2018 for EP Application No. 18154899.1.

(Continued)

*Primary Examiner* — K. Wong
(74) *Attorney, Agent, or Firm* — Nixon & Vanderhye P.C.

(57) ABSTRACT

A method for providing a notification and/or an electronic device thereof are provided. The electronic device may include an output device, a communication circuitry, and a processor. The processor may be configured to receive a first notification from a first external electronic device via the communication circuitry, receive a second notification from a second external electronic device via the communication circuitry, determine whether the first notification and the second notification match, and when the first notification and the second notification match each other, output an output signal corresponding to a selected notification among the first notification and the second notification through the output device and/or an external output device operatively coupled to the electronic device, and disregard a non-selected notification among the first notification and the second notification.

20 Claims, 18 Drawing Sheets

(51) Int. Cl.
*H04W 4/80* (2018.01)
*H04L 29/08* (2006.01)

(52) U.S. Cl.
CPC ............... *H04R 1/025* (2013.01); *H04R 3/00* (2013.01); *H04L 67/12* (2013.01); *H04R 2420/07* (2013.01); *H04W 4/80* (2018.02)

(56) References Cited

U.S. PATENT DOCUMENTS

| | | | |
|---|---|---|---|
| 9,462,434 B2 | 10/2016 | Izumi et al. | |
| 9,836,182 B2* | 12/2017 | Park | .................. G06F 3/0486 |
| 2013/0244576 A1 | 9/2013 | Morohoshi | |
| 2014/0155110 A1* | 6/2014 | Park | .................. H04M 1/6091 |
| | | | 455/458 |
| 2014/0179377 A1* | 6/2014 | Song | .................. H04W 4/20 |
| | | | 455/566 |
| 2015/0237598 A1 | 8/2015 | Yoshitomi et al. | |
| 2016/0255487 A1 | 9/2016 | Abu-Hakima et al. | |

FOREIGN PATENT DOCUMENTS

| | | |
|---|---|---|
| WO | WO 2005/078997 | 8/2005 |
| WO | WO 2016/141133 | 9/2016 |
| WO | WO 2016/172213 | 10/2016 |

OTHER PUBLICATIONS

European Office Action for EP Application No. 18154899.1 dated Mar. 22, 2019.

\* cited by examiner

METHOD FOR PROVIDING NOTIFICATION AND ELECTRONIC DEVICE THEREOF

CROSS-REFERENCE TO RELATED APPLICATION

This application is based on and claims priority under 35 U.S.C. § 119 to a Korean Patent Application entitled "METHOD FOR PROVIDING NOTIFICATION AND ELECTRONIC DEVICE THEREOF" filed in the Korean Intellectual Property Office on Feb. 3, 2017 and assigned Serial No. "10-2017-0015619", the contents of which is incorporated by reference herein in its entirety.

BACKGROUND

1. Field

Various example embodiments relate to a method and/or apparatus for outputting notification information corresponding to a plurality of notification signals in an electronic device.

2. Description of Related Art

With the development of information communication technologies and semiconductor technologies, electronic devices can provide various services such as a voice service, a message service, and an Internet of Things (IoT) service. For example, an electronic device providing a notification service (hereinafter, referred to as an "electronic device") can provide a notification service of, when a notification signal is received from an electronic device providing notification information (hereinafter, referred to as an "external electronic device") to the electronic device, outputting notification information corresponding to the notification signal such as a short message service (SMS) message, a chatting message, an alert text message, a social networking service (SNS) notification or the like through a voice or text.

SUMMARY

When receiving a majority of notification signals including the same content from a majority of external electronic devices, an electronic device outputs notification information corresponding to all the notification signals including the same content. This can deteriorate a convenience of a user of the electronic device.

Also, when outputting the notification information corresponding to the notification signal received from the external electronic device, the electronic device outputs the notification information corresponding to the notification signal according to uniform notification setting (e.g., a voice volume, a tone, a text size, a font, the number of times of output, etc.). This can result in a problem in which the electronic device is difficult to meet various needs of a user.

Also, the electronic device outputs the notification information corresponding to the received notification signal without considering users of the external electronic devices adjacent to the electronic device. This can cause a problem in which the intrusion of user's privacy takes place, because the electronic device outputs notification information that the user does not want to make public.

Various example embodiments may provide a method and/or apparatus for selectively outputting notification information corresponding to a notification signal based on repetition or non-repetition of the notification signal in an electronic device.

Various example embodiments may provide a method and/or apparatus for selectively outputting notification information corresponding to a notification signal according to existence or non-existence of an external electronic device in an electronic device.

Various example embodiments may provide a method and/or apparatus for changing a notification setting(s) in consideration of a characteristic(s) of a user in an electronic device.

According to various example embodiments, an electronic device may include a housing, a speaker of which the at least part is located in the inside of the housing, a wireless communication circuitry located in the inside of the housing, and configured to provide a radio range covering an audible distance of a sound outputted from the speaker, a processor located in the inside of the housing, and electrically connected with the wireless communication circuitry, and a memory located in the inside of the housing, and electrically connected with the processor, and the memory may store instructions that, when, executed, cause the processor to wirelessly connect with a first external electronic device configured to forward a notification signal from a notification source device and a second external electronic device configured to forward a notification signal from the notification source device, through the wireless communication circuitry, receive a first notification signal from the first external electronic device through the wireless communication circuitry, receive a second notification signal from the second external electronic device through the wireless communication circuitry, determine whether the second notification signal has the same content as the first notification signal, provide an audio signal to the speaker based on the first notification signal, and generate, by the speaker, a sound based at least on the audio signal.

According to various example embodiments, an electronic device may include an output device, a communication circuitry, and a processor, and the processor may be configured to receive a first notification (i.e., notification signal) from a first external electronic device by using the communication circuitry, receive a second notification from a second external electronic device by using the communication circuitry, determine whether the first notification and the second notification match with each other, and when the first notification and the second notification match with each other, output an output signal corresponding to a selected notification among the first notification and the second notification through the output device or an external output device operatively coupled to the electronic device, and disregard a non-selected notification among the first notification and the second notification.

DETAILED DESCRIPTION

Figure 1:
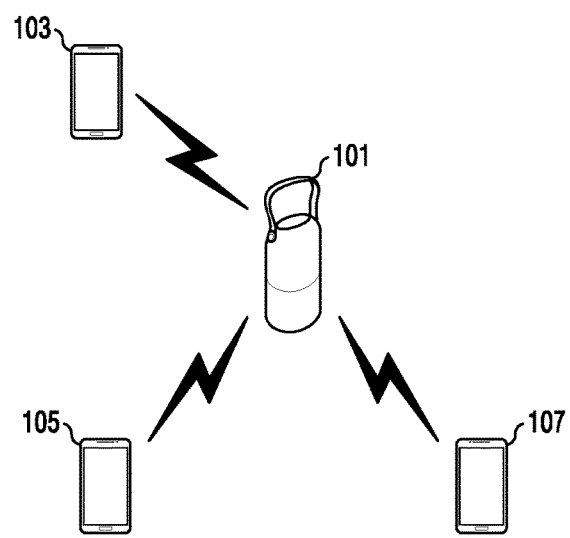
FIG. 1 illustrates a conceptual diagram for describing a method for providing a notification according to various example embodiments.

Various example embodiments of the present document are mentioned below with reference to the accompanying drawings. An example embodiment and the terms used in this are not to limit the technology mentioned in the present document to a specific embodiment form, and should be construed as including various changes, equivalents, and/or alternatives of the corresponding example embodiment. In relation to a description of the drawing, like reference symbols may denote like constituent elements. The expression of a singular form may include the expression of a plural form unless otherwise dictating clearly in context. In the present document, the expression "A or B", "at least one of A and/or B" or the like may include all available combinations of words enumerated together. The expressions "a first", "a second", "the first", "the second", etc. may modify corresponding constituent elements irrespective of order and/or importance, and are just used to distinguish one constituent element from another constituent element and do not limit the corresponding constituent elements. When it is mentioned that any (e.g., first) constituent element is "(operatively or communicatively) coupled with/to" or is "connected to" another (e.g., second) constituent element, the any constituent element can be directly coupled to the another constituent element, or be coupled through a further constituent element(s) (e.g., a third constituent element).

In the present document, the expression "configured (or set) to~" may be used interchangeably with, for example, "suitable for~", "having the capacity to~", "adapted to~", "made to~", "capable of~", or "designed to~" in a hardware or software manner in accordance to circumstances. In some context, the expression "device configured to~" may represent that the device is "capable of ~" together with other devices or components. For example, the phrase "processor configured (or set) to perform A, B, and C" may represent a dedicated processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various example embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera, or a wearable device. The wearable device may include at least one of an accessory type (e.g., a watch, a ring, a wristlet, an anklet, a necklace, glasses, contact lens, or head-mounted-device (HMD)), fabric or clothing integral type (e.g., electronic clothes), human-body mount type (e.g., a skin pad or tattoo), or bio implantation type circuitry. In some example embodiment, the electronic device may, for example, include at least one of a television (TV), a digital video disk (DVD) player, an audio system, a refrigerator, an air conditioner, a cleaner, an oven, a microwave, a washing machine, an air cleaner, a set-top box, a home automation control panel, a security control panel, a media box (e.g., Samsung HomeSync™, Apple TV™, or Google TV™), a game console (e.g., Xbox™ or PlayStation™), an electronic dictionary, an electronic locking system, a camcorder, or an electronic frame.

In another example embodiment, the electronic device may include at least one of various medical devices (e.g., various portable medical measurement devices (i.e., a blood glucose sensor, a heat rate sensor, a blood pressure monitor, a body temperature meter or the like), magnetic resonance angiography (MRA), magnetic resonance imaging (MRI), computed tomography (CT), a photographing machine, an ultrasonic machine or the like), a navigation device, a global navigation satellite system (GNSS), an event data recorder (EDR), a flight data recorder (FDR), a car infotainment device, an electronic equipment for ship (e.g., a navigation device for ship, a gyrocompass, etc.), avionics, a security device, a head unit for car, an industrial or home robot, a drone, an automatic teller's machine (ATM) of a financial institution, a point of sales (POS) of a shop, or an Internet of Things (IoT) device (e.g., an electric bulb, various sensors, a sprinkler device, a fire alarm, a thermostat, a streetlight, a toaster, an exerciser, a hot water tank, a heater, a boiler, etc.). According to some example embodiment, the electronic device may include at least one of a part of furniture, a building/structure or a car, an electronic board, an electronic signature receiving device, a projector, or various metering devices (e.g., tap water, electricity, gas, radio wave metering devices or the like). In various example embodiments, the electronic device may be flexible, or be a combination of two or more of the aforementioned various devices. The electronic device according to an example embodiment of the present document is not limited to the aforementioned devices. In the present document, the term 'user' may denote a person who uses the electronic device or a device (e.g., an artificial-intelligence electronic device) which uses the electronic device.

FIG. 1 illustrates a conceptual diagram for describing a method for providing a notification according to various example embodiments.

According to an example embodiment, an electronic device 101 may output notification information corresponding to a notification signal that has been received from at least one external electronic device 103, 105 and/or 107, which may be located around the electronic device 101. For example, the electronic device 101 may wirelessly (e.g., short-range communication such as BT, BLE, WiFi or the like) connected with the at least one external electronic device 103, 105 and/or 107 located around the electronic device 101. The electronic device 101 may receive a majority of notification signals from the wirelessly connected at least one external electronic device 103, 105 and/or 107.

According to an example embodiment, when the contents of the majority of received notification signals are not the same as one another, the electronic device 101 may output notification information corresponding to each notification signal in a sequential manner or based on a set reference (e.g., priority). Here, the notification information may include at least one of the content of the notification signal, and/or a notification sound or message for notifying that the notification signal is received (e.g., "a message has arrived" or "message received"). The content of the notification signal may include at least one of a type of the notification signal, sender information, a sending time, a receiving time, text substance, and/or an image shape.

According to an example embodiment, when the contents of the majority of received notification signals are the same as one another, the electronic device 101 may select notification information corresponding to any one of the majority of notification signals and output (e.g., voice, text, image or video output, etc.) the selected notification information. For example, when having received notification signals including the same content from a majority of external electronic devices, the electronic device 101 may output only notification information corresponding to a firstly received notification signal.

According to an example embodiment, when the electronic device 101 has received notification signals including the same content from a majority of external electronic devices, the electronic device 101 may control the majority of external electronic devices so that the notification signal may be transmitted only from any one of the external electronic device among the majority of external electronic devices 103, 105, 107. For example, the electronic device 101 may transmit a signal granting a notification signal transmission authority to an external electronic device having transmitted a notification signal corresponding to selected and outputted notification information, and transmit a signal withdrawing the notification signal transmission authority to an external electronic device having transmitted the remaining notification signal, thereby preventing or reducing the likelihood of receiving the notification information on the same content from the majority of external electronic devices.

According to an example embodiment, the electronic device 101 may selectively output notification information corresponding to a notification signal in consideration of an external electronic device (e.g., the external electronic device 103, 105 or 107) located around and/or wirelessly coupled to the electronic device 101. For example, when the external electronic devices (e.g., the second external electronic device 105 and the third external electronic device 107) other than the first external electronic device 103 having transmitted a notification signal satisfy an output condition included in setting information of the first external electronic device 103 having transmitted the notification signal, the electronic device 101 may output notification information corresponding to the notification signal. Here, the setting information is information for determining whether to output notification information corresponding to a notification signal, and may include at least one of setting or non-setting of third-party notification block, a preference group, or a block group. Here, the setting or non-setting of the third-party notification block may include information on whether a mode of limiting the output of notification information corresponding to a notification signal has been activated, when an external electronic device exists around the electronic device 101. The preference group may include a list of a specific external electronic device(s) which permits the output of notification information corresponding to a notification signal so that the notification information may be outputted, when the specific external electronic device exists around the electronic device 101 in a state in which the electronic device 101 has been set as the third-party notification block. The block group may include a list of a specific external electronic device(s) which desires blocking to limit the output of notification information corresponding to a notification signal, when the specific external electronic device exists around the electronic device 101 in a state in which the electronic device 101 has not been set as the third-party notification block. The setting information may be stored in the external electronic device 103, 105 or 107, and/or may be received from the external electronic device 103, 105 or 107 and stored in the electronic device 101.

According to an example embodiment, the electronic device 101 may change the form of notification output based on a notification setting value of an external electronic device having transmitted a notification signal. For example, the electronic device 101 may identify the notification setting value of the external electronic device having transmitted the notification signal. The electronic device 101 may change notification setting of the electronic device 101 to correspond the notification setting value of the external electronic device. The electronic device 101 may output notification information corresponding to the notification signal according to the changed notification setting. Here, the notification setting value may include at least one of a voice volume, a speed, a tone, a font, a text size, and/or the number of times of notification repetition.

According to an example embodiment, when the first external electronic device 103 has received a notification signal from a notification source device, the first external electronic device 103 may detect an external electronic device having received a notification signal including the same content. For example, based on at least one of identification information (e.g., a message ID) of a notification signal or content information of the notification signal broadcasted from at least one of the second external electronic device 105 or the third external electronic device 107, the first external electronic device 103 may check existence or non-existence of an external electronic device which intends to transmit a notification signal for the same content.

According to an example embodiment, a majority of external electronic devices may select one external electronic device(s) having a notification signal transmission authority over a notification signal including the same content. For example, when the second external electronic device 105 has received a notification signal including the same content, the first external electronic device 103 may select one external electronic device having a notification signal transmission authority, based on at least one of state information (e.g., battery information, performance information and/or application running information) of each external electronic device, a receiving time of the notification signal, or a signal strength of the notification signal. When the first external electronic device 103 has been selected, the first external electronic device 103 may transmit a signal withdrawing a notification signal transmission authority to the second external electronic device 105. The first external electronic device 103 may transmit the received notification signal to the electronic device 101. When the second external electronic device 105 has been selected, the first external electronic device 103 may transmit a signal granting a notification signal transmission authority to the second external electronic device 105, and disregard the received notification signal.

According to an example embodiment, the first external electronic device 103 may selectively transmit notification information corresponding to a notification signal to the electronic device 101, in consideration of the nearby-located second external electronic device 105 and third external electronic device 107. For example, when the second external electronic device 105 and the third external electronic device 107 satisfy a notification output condition included in setting information of the first external electronic device 103, the first external electronic device 103 may transmit the notification signal to the electronic device 101.

Figure 2:
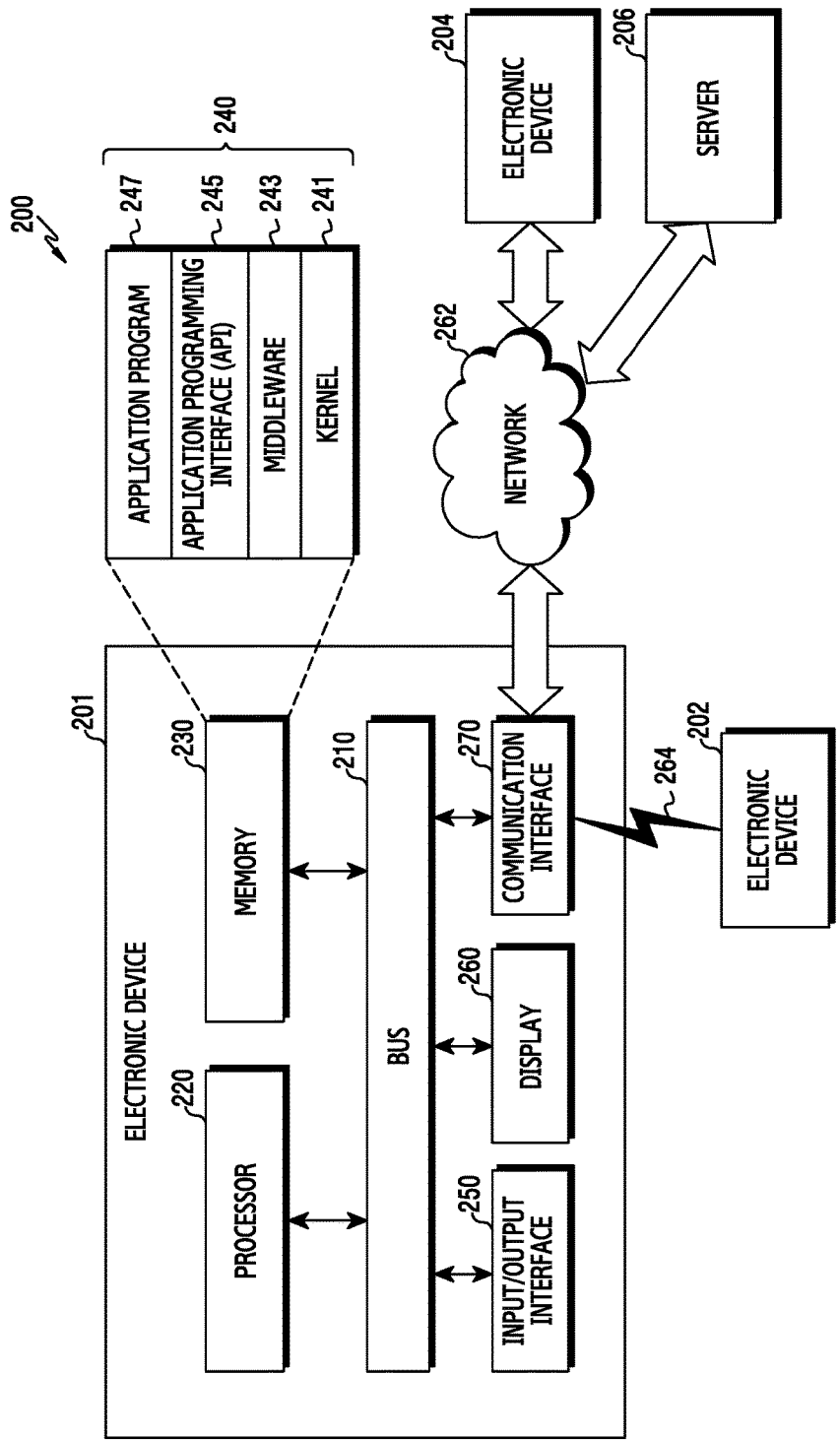
FIG. 2 illustrates an environment of a network including an electronic device according to various example embodiments.

FIG. 2 illustrates an environment of a network including an electronic device according to various example embodiments. In the following description, the electronic device may, for example, include the electronic device 101 or external electronic device 103, 105 or 107 of FIG. 1.

Referring to FIG. 2, the electronic device 201 (or 101, 103, 105, and/or 107) may include a bus 210, a processor 220 including processing circuitry, a memory 230, an input output interface 250 including interface circuitry, a display 260, and a communication interface 270 including interface circuitry. In some example embodiment, the electronic device 201 may omit at least one of the constituent elements or additionally have another constituent element.

The bus 210 may, for example, include a circuitry connecting the constituent elements 220 to 270 with one another and forwarding communication (e.g., a control message and/or data) between the constituent elements.

The processor 220 may include one or more of a central processing unit (CPU), an application processor (AP), or a communication processor (CP). The processor 220 may, for example, execute operation or data processing for control and/or communication of at least one another constituent element of the electronic device 201.

According to an example embodiment, the processor 220 may control the communication interface 270 to receive a majority of notification signals from at least one external electronic device wirelessly connected with the electronic device 201. For example, the processor 220 may control the communication interface 270 so that a beacon signal may be broadcasted. The processor 220 may receive a response signal to the beacon signal through the communication interface 270. The processor 220 may detect at least one external electronic device located around the electronic device 201 based on the response signal. The processor 220 may wirelessly connect (e.g., short-range communication 264 such as BT or WiFi, and/or via network 262) with the at least one external electronic device 202, 204 and/or 206 detected through the communication interface 270, and receive a majority of notification signals from the wirelessly connected at least one external electronic device.

According to an example embodiment, when a majority of notification signals are received, the processor 220 may check whether the majority of notification signals match with one another. For example, when having received a majority of group chatting messages, the processor 220 may determine whether the same group chatting message exits by identifying at least one of an ID of a group chatting room, sender information, information of a converser who belongs to the group chatting room, a message sending time, a message receiving time, or message substance (e.g., a text and an image). For another example, when having received a majority of IoT messages, the processor 220 may determine whether the same IoT message has been received by identifying at least one of sender information of the IoT message, a message sending time, a message receiving time, or message substance. According to an example embodiment, the processor 220 may determine whether a notification signal including the same content exists, for notification signals received during a specified period of time (e.g., 3 seconds) as well.

According to an example embodiment, when a majority of received notification signals match with one another, the processor 220 may select any one notification signal among the majority of notification signals. For example, the processor 220 may identify at least one of state information (e.g., battery information, performance information (e.g., hardware specification), application running information or the like) of external electronic devices having transmitted notification signals including the same content, signal strengths (i.e., received signal strength indication (RSSI)) of the notification signals, or a receiving time of the notification signals. The processor 220 may select any one of a majority of the notification signals including the same content based on the identified information.

According to an example embodiment, the processor 220 may control at least one of a speaker (not shown), the display 260, and/or a light emitting diode (LED) (not shown) to output notification information corresponding to a notification signal according to notification setting which has been changed to correspond to a notification setting value of an external electronic device. For example, when any one of a majority of notification signals including the same content has been selected, the processor 220 may identify a notification setting value (i.e., an age of a user, a voice volume, a speed, a tone, etc.) of each of external electronic device(s) having transmitted the majority of notification signals. The processor 220 may determine an age group of a user of the external electronic device based on the notification setting value. The processor 220 may change notification setting of the electronic device 201 to correspond to a notification setting value of an external electronic device of a user who is determined to belong to the highest age group. The processor 220 may control at least one of the speaker or the display 260 to output notification information based on the notification setting value of the at least one external electronic device. For another example, when any one of a majority of notification signals including the same content has been selected, the processor 220 may change notification setting of the electronic device 201 to correspond to a notification setting value of an external electronic device having transmitted the selected notification signal. The processor 220 may control at least one of the speaker or the display 260 to output notification information based on the notification setting value of the external electronic device having transmitted the selected notification signal.

According to an example embodiment, the processor 220 may control to transmit, via the communication interface 270, a signal withdrawing a notification signal transmission authority to an external electronic device(s) having transmitted a non-selected notification signal(s). In this case, when a notification signal received from the same sender as a sender of the non-selected notification signal, a notification signal having the same identification information as the non-selected notification signal, or the like is received during a constant period of time (e.g., 10 minutes), the external electronic device having received the signal withdrawing the notification signal transmission authority may disregard the corresponding notification signal.

According to an example embodiment, the processor 220 may control at least one of the speaker (not shown), the display 260, and/or the LED (not shown) to output notification information corresponding to a notification signal in consideration of an external electronic device. For example, the processor 220 may determine whether a list of external electronic devices wirelessly connected with the electronic device 201 satisfies a notification output condition included in setting information of an external electronic device having transmitted notification information. When the list of external electronic devices wirelessly connected with the electronic device 201 satisfies the notification output condition included in the setting information, the processor 220 may output notification information corresponding to a notification signal. For instance, the processor 220 may change notification setting to correspond to a notification setting value of an external electronic device having transmitted a notification signal. The processor 220 may control at least one of the speaker (not shown), the display 260, or the LED (not shown) to output notification information corresponding to the notification signal according to the changed notification setting.

According to an example embodiment, the processor 220 may identify the occurrence of a notification event. For example, the processor 220 may receive a notification signal such as a text message, a group chatting message, an IoT message, an alert message, an advertisement message or the like, from a notification source device (e.g., the server 206) via the communication interface 270. When the notification signal has been received, the processor 220 may determine that the notification event has occurred.

According to an example embodiment, the processor 220 may search an external electronic device (e.g., the external electronic device 202) having received a notification signal including the same content, in response to the occurrence of a notification event. For example, when a notification signal has been received, the processor 220 may broadcast at least one of identification information (e.g., a message ID) of the notification signal or content information of the notification signal through the communication interface 270. The processor 220 may search an external electronic device located around the electronic device 201 based on the identification information of the notification signal or the content information of the notification signal broadcasted from the external electronic device located around the electronic device 201. The processor 220 may determine whether an external electronic device having received a notification signal including the same content exists among the external electronic devices having been searched based on the identification information of the notification signal or the content information of the notification signal.

According to an example embodiment, when an external electronic device having received a notification signal including the same content exists, the processor 220 may set a notification signal transmission authority. For example, the processor 220 may wirelessly (e.g., short-range communication) connect with the external electronic device having received the notification signal including the same content, through the communication interface 270. The processor 220 may identify at least one of state information (e.g., battery information, performance information, application running information or the like) of each external electronic device, a receiving time of the notification signal, or a signal strength of the notification signal, from the wirelessly connected external electronic device. The processor 220 may select one electronic device that will transmit a notification signal to an external electronic device (e.g., the electronic device 101) for outputting a notification based on the identified information. When the electronic device 201 has been selected, the processor 220 may transmit a signal notifying a withdrawal of a notification signal transmission authority to the external electronic device wirelessly connected with the electronic device 201. In this case, the external electronic device wirelessly connected with the electronic device 201 may not perform an operation of transmitting the notification signal to the external electronic device for outputting the notification, in response to reception of the signal withdrawing the notification signal transmission authority.

According to an example embodiment, while satisfying a set condition (e.g., time or environment change, etc.), an external electronic device(s) may not perform an operation of transmitting a notification signal to an external electronic device in order to output a notification. For example, the external electronic device may not transmit, to an external electronic device (e.g., the electronic device 101), or may disregard a notification output request during a constant period of time (e.g., 10 minutes) regarding a notification signal including the same sender or the same identification information as a sender of a notification signal having not been transmitted to a device for outputting a notification. For another example, the external electronic device may not transmit, to an external electronic device (e.g., the electronic device 101), or may disregard a notification output request until before a change of the surrounding environment (e.g., disconnecting of short-range communication connection with the electronic device 201, retrieving of a new external electronic device, or the like) occurs regarding a notification signal including the same sender or the same identification information as a sender of a notification signal having not been transmitted to a device for outputting a notification.

According to an example embodiment, when the electronic device 201 fails to have authority capable of transmitting a notification signal to an external electronic device (e.g., the electronic device 101), the processor 220 may transmit a signal granting a notification signal transmission authority to the selected external electronic device, and transmit a signal withdrawing the notification signal transmission authority to the remaining external electronic device. In this case, the processor 220 may not perform an operation of transmitting the received notification signal to an external electronic device for outputting a notification, or may disregard the notification signal.

According to an example embodiment, the processor 220 may transmit a notification signal to an external electronic device (e.g., the electronic device 101, or 103, or 105, or 107) for outputting a notification. For example, when the electronic device 201 has been selected as a device having a notification signal transmission authority, the processor 220 may control the communication interface 270 to transmit the notification signal to the external electronic device for outputting the notification. In this case, the external electronic device for outputting the notification may change notification setting to correspond to a notification setting value of the electronic device 201, and output notification information corresponding to the notification signal according to the changed notification setting.

According to an example embodiment, the processor 220 may transmit a notification signal to an electronic device (e.g., the electronic device 101, 103, 105, or 107) for outputting a notification, based on setting information. For example, when having received a notification signal from a notification source device (e.g., the electronic device 202 or 204, or the server 206), the processor 220 may search an external electronic device located around the electronic device 201. The processor 220 may determine whether a list of the searched external electronic device satisfies a notification output condition included in setting information of the electronic device 201. When the list of the searched external electronic device satisfies the notification output condition included in the setting information of the electronic device 201, the processor 220 may control the communication interface 270 to transmit a notification signal to an electronic device (e.g., the electronic device 101, 103, 105, or 107) for outputting a notification.

The memory 230 may include a volatile and/or non-volatile memory. The memory 230 may, for example, store a command or data related to at least one another constituent element of the electronic device 201. According to an example embodiment, the memory 230 may store a software and/or program 240. The program 240 may, for example, include a kernel 241, a middleware 243, an application programming interface (API) 245, an application program (or "application") 247 and/or the like. At least some of the kernel 241, the middleware 243, or the API 245 may be called an operating system (OS). The kernel 241 may, for example, control or manage system resources (e.g., the bus 210, the processor 220, the memory 230 or the like) that are used for executing operations or functions implemented in the other programs (e.g., the middleware 243, the API 245, or the application program 247). Also, the kernel 241 may provide an interface capable of controlling or managing the system resources of the electronic device 201 by enabling the middleware 243, the API 245, or the application program 247 to access the individual constituent element of the electronic device 201. According to an example embodiment, the memory 230 may store a notification signal received from an external electronic device (e.g., the external electronic device 103, 105 or 107). According to an example embodiment, the memory 230 may store a notification signal transmitted from a notification source device (e.g., the electronic device 202 or 204 or the server 206). According to an example embodiment, the memory 230 may store setting information of the electronic device. Here, the setting information may be changed according to a user's taste and convenience.

The middleware 243 may, for example, perform a relay role of enabling the API 245 or the application program 247 to communicate and exchange data with the kernel 241. Also, the middleware 243 may process one or more work requests received from the application program 247 according to priority. For example, the middleware 243 may grant at least one of the application programs 247 a priority capable of using the system resources (e.g., the bus 210, the processor 220, the memory 230 or the like) of the electronic device 201, and process the one or more work requests. The API 245 is an interface enabling the application program 247 to control a function provided by the kernel 241 or the middleware 243 and may, for example, include at least one interface or function (e.g., an instruction) for file control, window control, image processing, character control or the like. The input output interface 250 may, for example, forward a command or data inputted from a user or another external device, to another constituent element(s) of the electronic device 201, or output a command or data received from the another constituent element(s) of the electronic device 201, to the user or another external device.

The display 260 may, for example, include a liquid crystal display (LCD), a light emitting diode (LED) display, an organic light emitting diode (OLED) display, or a microelectromechanical systems (MEMS) display, or an electronic paper display. The display 260 may, for example, display various contents (e.g., a text, an image, a video, an icon, a symbol and/or the like) to a user. The display 260 may include a touch screen and, for example, may receive a touch, gesture, proximity, or hovering input that uses an electronic pen or a part of the user's body. According to an example embodiment, the display 260 may output notification information corresponding to a notification signal transmitted from an external electronic device wirelessly connected with the electronic device 201. For example, the display 260 may output an advertisement message (or an IoT message, a group chatting message or a text message). According to an example embodiment, the display 260 may output notification information according to notification setting(s) which has been changed to correspond to a notification setting value(s) of an external electronic device(s) having transmitted a notification signal. For example, the display 260 may output notification information corresponding to a notification signal according to a text size, a scroll speed, and/or the number of times of repetition corresponding to a notification setting value included in setting information of an external electronic device having transmitted the notification signal.

The communication interface 270 (e.g., wireless communication circuitry or communication circuitry) may, for example, establish communication between the electronic device 201 and an external device (e.g., the first external electronic device 202, the second external electronic device 204, and/or the server 206). For example, the communication interface 270 may be connected to a network 262 through wireless communication or wired communication, and communicate with the external device (e.g., the second external electronic device 204 or the server 206).

The wireless communication via 264 and/or network 262 may include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), etc. According to an example embodiment, the wireless communication may, for example, as illustrated by an element 264 of FIG. 2, include at least one of wireless fidelity (WiFi), light fidelity (LiFi), Bluetooth (BT), Bluetooth low energy (BLE), Zigbee, near field communication (NFC), magnetic secure transmission (MST), radio frequency (RF), or body area network (BAN).

According to an example embodiment, the wireless communication may include GNSS. The GNSS may, for example, be a global positioning system (GPS), a global navigation satellite system (Glonass), Beidou navigation satellite system (Beidou), or the European global satellite-based navigation system (Galileo). Below, in the present document, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS) or the like. The network 262 may include a telecommunications network, for example, at least one of a computer network (e.g., local area network (LAN) or wide area network (WAN)), the Internet, or a telephone network.

The first and second external electronic devices 202 and 204 each may be a device of the same or different type from that of the electronic device 201. According to various example embodiments, all or some of operations executed in the electronic device 201 may be executed in another or a plurality of electronic devices (e.g., the external electronic devices 202 and 204 or the server 206). According to an example embodiment, when the electronic device 201 has to perform some function or service automatically or by a request, the electronic device 201 may, instead of or additionally to executing the function or service in itself, request at least a partial function associated with this to another device (e.g., the external electronic devices 202 and 204 or the server 206). The another electronic device (e.g., the external electronic device 202, 204 or the server 206) may execute the requested function or additional function, and forward the execution result to the electronic device 201. The electronic device 201 may process the received result as it is or additionally, thereby providing the requested function or service. For this, a cloud computing, distributed computing, or client-server computing technology may be used, for example.

Figure 3:
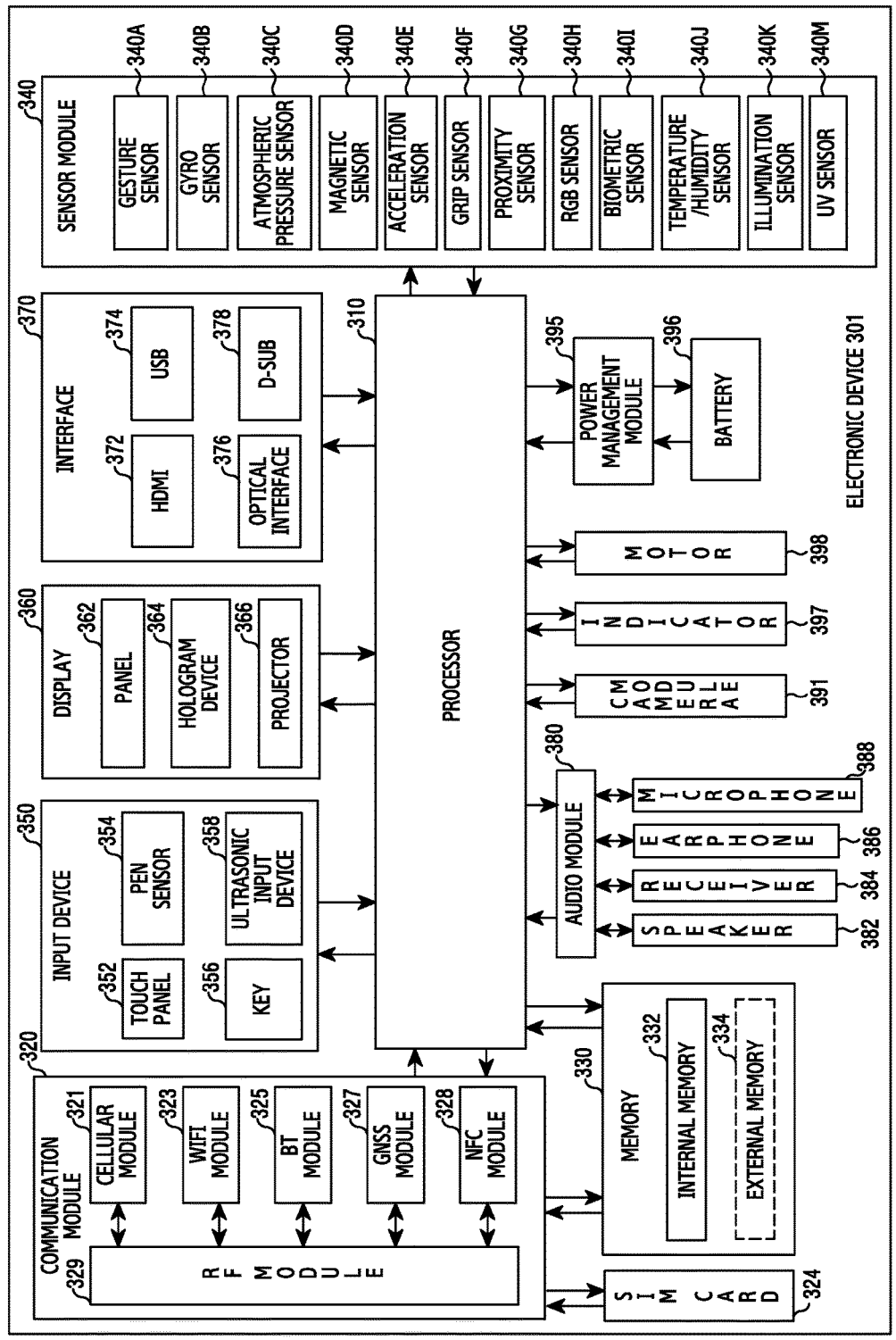
FIG. 3 illustrates a block diagram of an electronic device according to various example embodiments.

FIG. 3 is a block diagram of an electronic device 301 (or 101, 103, 105, 107, 201), according to various example embodiments.

The electronic device 301, for example, can include all or some of the electronic device 201 shown in FIG. 2. The electronic device 301 can include one or more processors (for example, the AP) 310, a communication module 320, a subscriber identification module 324, a memory 330, a sensor module 340, an input device 350, a display 360, an interface 370, an audio module 380, a camera module 391, a power management module 395, a battery 396, an indicator 397, and a motor 398.

The processor 310, for example, can control a multitude of hardware or software elements that are connected with the processor 310, and can perform the processing of a variety of data and a calculation by executing an operating system or application programs. The processor 310 can be implemented by, for example, a system on chip (SoC). According to an embodiment, the processor 310 can further include a graphic processing unit (GPU) and/or an image signal processor. The processor 310 can include at least some (for example, a cellular module 321) of the elements shown in FIG. 3. The processor 310 can load instructions or data received from one or more other elements (for example, a non-volatile memory) to a volatile memory to then process the same, and can store the result data thereof in a non-volatile memory.

According to various example embodiments, the processor 310 (for example, the processor 220) can identify the occurrence of a touch on a touch panel 352. The processor 310 can identify the position in which the touch has occurred. The processor 310 can identify at least one of the equipped sensors that are provided in the electronic device 301, which corresponds to the identified position. To this end, the processor 310 can map coordinate values on the display 360 (for example, the display 260), which correspond to the positions of the equipped sensors that are provided in the electronic device 201, and can store the same in the memory 330 (for example, the memory 230). The processor 310 can map coordinate values with respect to the area in a threshold distance based on the coordinate value together to then store the same in the memory 330 when mapping the coordinate values corresponding to the positions of the equipped sensors on the display 260. The processor 310 can identify a coordinate value corresponding to the position in which a touch has occurred, and can control a specific sensor corresponding to the identified coordinate value. The processor 310 can display the current state of a specific sensor, and can display, on the display 260, a screen that is related to a function of the specific sensor. According to various embodiments, when a touch occurs on the touch panel 352, the processor 310 can identify the position in which the touch has occurred and a change in the pressure at the touch occurrence time. The processor 310 can identify a central point of the area where the touch is detected. The processor 310 can identify the position in which the touch has occurred based on the identified central point and the position in which a pressure change is the maximum. The processor 310 can control a specific sensor corresponding to the position in which the touch has occurred.

The communication module 320 can have the configuration that is identical or similar to the configuration of the communication interface 270. The communication module 320, for example, can include a cellular module 321, a WiFi module 323, a Bluetooth module 325, a GNSS module 327, an NFC module 328, and an RF module 329. The cellular module 321, for example, can provide services of voice calls, video calls, text messaging, or the Internet through communication networks. According to an embodiment, the cellular module 321 can perform identification and verification of the electronic device 301 in communication networks by using the subscriber identification module 324 (for example, the SIM card). According to an embodiment, the cellular module 321 can perform at least some of the functions that are provided by the processor 310. According to an embodiment, the cellular module 321 can include a communication processor (CP). According to a certain embodiment, at least some (for example, two or more) of the cellular module 321, the WiFi® module 323, the Bluetooth module 325, the GNSS® module 327, or the NFC module 328 can be included in one integrated chip (IC) or one IC package. The RF module 329, for example, can transmit and receive communication signals (for example, RF signals). The RF module 329, for example, can include a transceiver, a power amp module (PAM), a frequency filter, a low noise amplifier (LNA), an antenna, or the like. According to another embodiment, at least one of the cellular module 321, the WiFi® module 323, the Bluetooth module 325, the GNSS module 327, or the NFC module 328 can transmit and receive RF signals through a separate RF module. The subscriber identification module 324, for example, can include a card including a subscriber identification module or an embedded SIM card, and can include inherent identification information {for example, an integrated circuit card identifier (ICCID)} or subscriber information {for example, an international mobile subscriber identity (IMSI)}.

The memory 330 (for example, the memory 230), for example, can include an internal memory 332 or an external memory 334. The memory 330 can map a sensor provided in the electronic device 201 with a coordinate value corresponding to the position of the sensor on the display 260, and can store the same under the control of the processor 310. The internal memory 332, for example, can include at least one of volatile memories (for example, DRAM, SRAM, SDRAM, or the like) or non-volatile memories {for example, OTPROM (one time programmable ROM), PROM, EPROM, EEPROM, mask ROM, flash ROM, a flash memory, a hard drive, or a solid-state drive (SSD)}. The external memory 334 can include a flash drive {for example, CF (compact flash), SD (secure digital), Micro-SD, Mini-SD, xD (extreme digital), a multi-media card (MMC), a memory stick, or the like}. The external memory 334 can be functionally or physically connected with the electronic device 301 through various interfaces.

The sensor module 340, for example, can measure physical quantities or can detect an operation state of the electronic device 301 to then convert the measured or detected information to electric signals. The sensor module 340, for example, can include at least one of a gesture sensor 340A, a gyro-sensor 340B, an atmospheric pressure sensor 340C, a magnetic sensor 340D, an acceleration sensor 340E, a grip sensor 340F, a proximity sensor 340G a color sensor 340H {for example, a red-green-blue (RGB) sensor}, a biometric sensor 340I, a temperature/humidity sensor 340J, an illuminance sensor 340K, an ultra violet (UV) sensor 340M, or a pressure sensor 340N. The biometric sensor 340I can include an iris sensor and/or a fingerprint sensor. Alternatively or additionally, the sensor module 340, for example, can include an E-nose sensor, an electromyography (EMG) sensor, an electroencephalogram (EEG) sensor, an electrocardiogram (ECG) sensor, and an infrared (IR) sensor. The sensor module 340 can further include a control circuit for controlling one or more sensors that are included therein. In a certain embodiment, the electronic device 301 can further include a processor as a part of, or separately from, the processor 310, which is configured to control the sensor module 340 in order to thereby control sensor module 340 while the processor 310 is in a sleep mode.

The input device 350, for example, can include a touch panel 352, a (digital) pen sensor 354, keys 356, or an ultrasonic input device 358. The touch panel 352, for example, can use at least one of a capacitive type, a pressure-sensitive type, an infrared type, or an ultrasonic type. The touch panel 352 can include one or more electrode layers, and one or more electrode layers can be directly formed on the second directional surface of a transparent substrate or on the first directional surface of the display, or can be formed on a separate film to then be attached to the transparent substrate or display. For example, one or more electrodes of the touch panel 352 can be disposed inside the display. In this case, one or more electrodes can be disposed between an upper plate and a lower plate of the display, and can be disposed between electrodes that are configured to drive the display. Alternatively, one or more electrodes of the touch panel 352 can be integrally formed with a polarizing layer. In addition, the touch panel 352 can further include a control circuit. The touch panel 352 can further include a tactile layer in order to thereby provide the user with a tactile reaction. The (digital) pen sensor 354, for example, can be a part of the touch panel, or can include a separate recognition sheet. The keys 356, for example, can include physical buttons, optical keys, or a keypad. The ultrasonic input device 358 can detect an ultrasonic wave that is generated in an input instrument through a microphone (for example, a microphone 388) to then identify data corresponding to the detected ultrasonic wave.

The display 360 (e.g., the display 260) may include a panel 362, a hologram device 364, or a projector 366. The panel 362 may include a configuration identical or similar to the display 260 illustrated in FIG. 2. The panel 362 may be implemented to be, for example, flexible, transparent, or wearable. The panel 362 may be embodied as a single module with the touch panel 352. The hologram device 364 may show a three dimensional (3D) image in the air by using an interference of light. The projector 366 may project light onto a screen to display an image. The screen may be located, for example, in the interior of or on the exterior of the electronic device 301. According to an example embodiment, the display 360 may further include a control circuit for controlling the panel 362, the hologram device 364, or the projector 366.

The interface 370 may include, for example, a high-definition multimedia interface (HDMI) 372, a universal serial bus (USB) 374, an optical interface 376, or a D-sub-miniature (D-sub) 378. The interface 370 may be included in, for example, the communication interface 270 illustrated in FIG. 2. Additionally or alternatively, the interface 370 may include, for example, a mobile high-definition link (MHL) interface, a SD card/MMC interface, or an infrared data association (IrDA) standard interface.

The audio module 380, for example, may bilaterally convert a sound and an electrical signal. At least some components of the audio module 380 may be included in, for example, the input/output interface 250 illustrated in FIG. 2. The audio module 380 may process voice information input or output through, for example, a speaker 382, a receiver 384, earphones 386, or the microphone 388.

The camera module 391 is, for example, a device which may photograph a still image and a video. According to an example embodiment, the camera module 391 may include one or more image sensors (e.g., a front sensor or a back sensor), a lens, an image signal processor (ISP) or a flash (e.g., LED or xenon lamp).

The power management module 395 may manage, for example, power of the electronic device 301. According to an example embodiment, the power management module 395 may include a power management integrated circuit (PMIC), a charger integrated circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 396, and a voltage, a current, or a temperature while charging. The battery 396 may include, for example, a rechargeable battery and/or a solar battery.

The indicator 397 may display a particular state (e.g., a booting state, a message state, a charging state, or the like) of the electronic device 301 or a part (e.g., the processor 310) of the electronic device 301. The motor 398 may convert an electrical signal into a mechanical vibration, and may generate a vibration, a haptic effect, or the like. Although not illustrated, the electronic device 301 may include a processing device (e.g., a GPU) for supporting a mobile TV. The processing device for supporting a mobile TV may process, for example, media data according to a certain standard such as digital multimedia broadcasting (DMB), digital video broadcasting (DVB), or mediaFlo™.

Each of the above-described component elements of hardware according to the present disclosure may be configured with one or more components, and the names of the corresponding component elements may vary based on the type of electronic device. In various example embodiments, the electronic device may include at least one of the above-described elements. Some of the above-described elements may be omitted from the electronic device, or the electronic device may further include additional elements. In addition, some of the hardware components according to various embodiments may be combined into one entity, which may perform functions identical to those of the relevant components before the combination.

Figure 4:
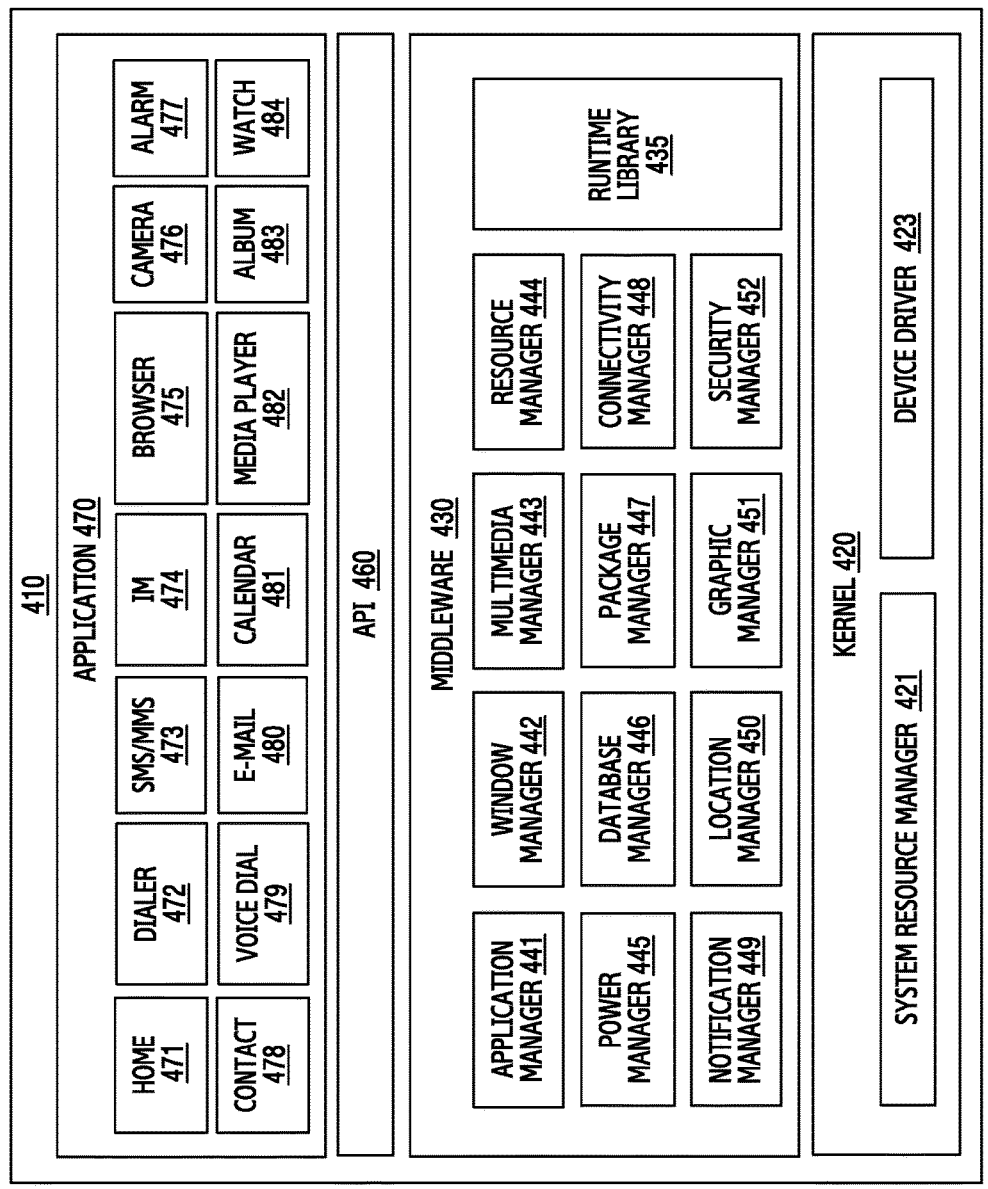
FIG. 4 illustrates a block diagram of a program module according to various example embodiments.

FIG. 4 is a block diagram of a program module, according to various example embodiments. According to an embodiment, the program module 410 (for example, the programs 240) can include an operating system (OS) for controlling resources that are related to the electronic device (for example, the electronic device 201) and/or various applications (for example, the application programs 247) that are operated under the operating system. For example, the operating system can be Android, iOS, Windows, Symbian, Tizen, Bada, or the like.

The program module 410 can include a kernel 420, middleware 430, an application programming interface (API) 460, and/or applications 470. At least some of the program module 410 can be preloaded in the electronic device, or can be downloaded from external electronic devices (for example, the electronic devices 202 and 204, or the server 206).

The kernel 420 (for example, the kernel 241), for example, can include a system resource manager 421 and/or a device driver 423. The system resource manager 421 can perform control, allocation, or collection of the system resources. According to an embodiment, the system resource manager 421 can include a process management unit, a memory management unit, or a file system management unit. The device driver 423, for example, can include a display driver, a camera driver, a Bluetooth driver, a shared memory driver, a USB driver, a keypad driver, a WiFi® driver, an audio driver, or an IPC (inter-process communication) driver.

As one of various example embodiments, the display driver can control one or more display driver ICs (DDI). The display driver can include functions for controlling a screen according to requests of the applications 470.

The middleware 430, for example, can provide functions required in common for the applications 470, or can provide various functions to the applications 470 through the API 460 in order to allow the applications 470 to effectively use limited system resources in the electronic device. According to an example embodiment, the middleware 430 (for example, the middleware 243) can include at least one of a run time library 435, an application manager 441, a window manager 442, a multimedia manager 443, a resource manager 444, a power manager 445, a database manager 446, a package manager 447, a connectivity manager 448, a notification manager 449, a location manager 450, a graphic manager 451, or a security manager 452.

The run time library 435, for example, can include a library module that a compiler uses in order to add new functions through programming languages while the applications 470 are executed. The run time library 435 can perform the input/output management, the memory management, or a function of an arithmetic calculation.

The application manager 441, for example, can manage a life cycle of at least one of the applications 470. The window manager 442 can manage a GUI resource that is used in the screen. For example, in the case where two or more displays 460 are connected, the screen can be differently configured or managed according to a screen ratio or the operation of the applications 470. The multimedia manager 443 can identify formats for reproducing various media files, and can perform encoding or decoding of media files by using a codec that conforms to the corresponding format. The resource manager 444 can manage resources, such as source codes, memories, or storage spaces of one or more applications 470.

The power manager 445, for example, can manage a battery or power by operating in association with a basic input/output system (BIOS), and can provide power information that is necessary for the operation of the electronic device. The database manager 446 can create, retrieve, or change a database that is to be used in one or more applications 470. The package manager 447 can manage the installation or updating of the applications that are distributed in the form of a package file.

The connectivity manager 448, for example, can manage a wireless connection, such as WiFi or Bluetooth. The notification manager 449 can display or notify of events (such as received messages, appointments, or proximity notifications) to the user without disturbance. The location manager 450 can manage location information of the electronic device. The graphic manager 451 can manage graphic effects to be provided to the user or user interfaces related thereto. The security manager 452 can provide a general security function that is required for the system security or user verification. According to an embodiment, in the case of the electronic device (for example, the electronic device 201) adopting a phone call function, the middleware 430 can further include a telephony manager for managing the functions of a voice call or a video call of the electronic device.

The middleware 430 can include a middleware module that forms a combination of various functions of the above-described elements. The middleware 430 can provide a module that is specialized according to the type of operating system in order to provide differentiated functions. In addition, the middleware 430 can dynamically exclude some of the typical elements or add new elements.

The API 460 (for example, the API 245), for example, can be a group of API programming functions, and can be provided as a different configuration according to an operating system. For example, one set of APIs can be provided to each platform in the case of Android or iOS, and two or more sets of APIs can be provided to each platform in the case of Tizen.

The applications 470 (for example, the application programs 247), for example, can include one or more applications that can execute functions of home 471, a dialer 472, SMS/MMS 473, IM (instant message) 474, a browser 475, a camera 476, an alarm 477, contacts 478, voice dial 479, e-mail 480, a calendar 481, a media player 482, an album 483, a clock 484, healthcare (for example, measuring the amount of exercise or blood glucose), providing environment information (for example, providing atmospheric pressure, humidity, or temperature information), or the like.

According to an example embodiment, the applications 470 can include an application (hereinafter, referred to as "information-exchange application" for the convenience of explanation) that supports the exchange of information between the electronic device (for example, the electronic device 201) and the external electronic device (for example, the electronic device 202 or 204). The information-exchange application, for example, can include a notification relay application for relaying specific information to the external electronic devices, or can include a device management application for managing the external electronic devices.

For example, the notification relay application can include a function of transferring notification information that is generated in other applications (for example, the SMS/MMS application, the e-mail application, the healthcare application, or the environment information application) of the electronic device to the external electronic device (for example, the electronic device 202 or 204). In addition, the notification relay application, for example, can receive notification information from the external electronic device to then provide the same to the user.

The device management application, for example, can manage (for example, install, delete, or update): one or more functions {for example, turning on and off the external electronic device (or some equipped sensors) or adjusting the brightness (or resolution) of a display} of the external electronic device (for example, the electronic device 202 or 204) that communicates with the electronic device; applications that are executed in the external electronic device; or services (for example, a phone call service or a messaging service) that are provided by the external electronic device.

According to an example embodiment, the applications 470 can include applications (for example, the healthcare application of a mobile medical device) that are designated according to the attribute of the external electronic device (for example, the electronic device 202 or 204). According to an embodiment, the applications 470 can include applications that are received from the external electronic device (for example, the server 206 or the electronic device 202 or 204). According to an embodiment, the applications 470 can include preloaded applications or third party applications that can be downloaded from a server. The names of the elements of the program module 410, according to the illustrated embodiment, can vary depending on the type of operating system.

According to various example embodiments, at least some of the program module 410 can be implemented by software, firmware, hardware, or a combination thereof. At least some of the program module 410, for example, can be implemented (for example, executed) by the processor (for example, the processor 220). At least some of the program module 410, for example, can include modules, program routines, sets of instructions, or processors for executing one or more functions.

According to various example embodiments, an electronic device (e.g., the electronic device 201 or 301 or 601) may include a housing, a speaker (e.g., the speaker 382 of FIG. 3) of which the at least part is located in the inside of the housing, a wireless communication circuitry (e.g., the communication interface 270 of FIG. 2 or the communication module 320 of FIG. 3) located in the inside of the housing, and configured to provide a radio range covering an audible distance of a sound outputted from the speaker, a processor (e.g., the processor 220 of FIG. 2 or the processor 310 of FIG. 3) located in the inside of the housing, and electrically connected with the wireless communication circuitry, and a memory (e.g., the memory 230 of FIG. 2 or the memory 330 of FIG. 3) located in the inside of the housing, and electrically connected with the processor, and the memory may store instruction that, when, executed, cause the processor to wirelessly connect with a first external electronic device configured to forward a notification signal from a notification source device and a second external electronic device configured to forward a notification signal from the notification source device, through the wireless communication circuitry, receive a first notification signal from the first external electronic device through the wireless communication circuitry, receive a second notification signal from the second external electronic device through the wireless communication circuitry, determine whether the second notification signal has the same content as the first notification signal, provide an audio signal to the speaker based on the first notification signal, and generate, by the speaker, a sound based at least on the audio signal.

According to various example embodiments, the instructions may enable the processor to determine whether the second notification signal is received within a selected time after reception of the first notification signal, and only when the second notification signal is received within the selected time after the reception of the first notification signal, determine whether the second notification signal has the same content as the first notification signal.

According to various example embodiments, the instructions may enable the processor to disregard the second notification signal if the second notification signal has the same content as the first notification signal.

According to various example embodiments, the wireless communication circuitry may be configured to support at least one of Wi-Fi or Bluetooth.

According to various example embodiments, the instructions may enable the processor to broadcast a beacon signal through the wireless communication circuitry, detect the first external electronic device and the second external electronic device based on a response signal to the beacon signal, and wireless connect with the first external electronic device and the second external electronic device through the wireless communication circuitry.

According to various example embodiments, the instructions enable the processor to identify state information of the first external electronic device and the second external electronic device, and select the first notification signal based on the state information, and the state information may include at least one of battery information, performance information, or application running information.

According to various example embodiments, the instructions enable the processor to identify signal strengths of the first notification signal and the second notification signal, and select the first notification signal based on the signal strength.

According to various example embodiments, the instructions enable the processor to identify receiving time of the first notification information and the second notification information, and select the first notification signal based on the receiving time.

According to various example embodiments, the instructions enable the processor to transmit a signal granting a notification signal transmission authority to the first external electronic device through the wireless communication circuitry, and transmit a signal withdrawing the notification signal transmission authority to the second external electronic device through the wireless communication circuitry.

According to various example embodiments, the instructions enable the processor to determine whether the second external electronic device satisfies a notification output condition included in setting information of the first external electronic device, and when the second external electronic device satisfies the notification output condition included in the setting information of the first external electronic device, provide an audio signal to the speaker based on the first notification signal.

According to various example embodiments, an electronic device may include an output device (e.g., the display 260 of FIG. 2, the display 360 of FIG. 3, or the speaker 382 of FIG. 3), a communication circuitry (e.g., the communication interface 270 of FIG. 2 or the communication module 320 of FIG. 3), and a processor (e.g., the processor 220 of FIG. 2 or the processor 310 of FIG. 3), and the processor may be configured to receive a first notification (i.e., notification signal) from a first external electronic device by using the communication circuitry, receive a second notification from a second external electronic device by using the communication circuitry, determine whether the first notification and the second notification match with each other, and when the first notification and the second notification match with each other, output an output signal corresponding to a selected notification among the first notification and the second notification through the output device or an external output device operatively coupled to the electronic device, and disregard a non-selected notification among the first notification and the second notification.

According to various example embodiments, the processor may be configured to check whether the first notification and the second notification have been transmitted to the first external electronic device and the second external electronic device from the same third external electronic device respectively, as at least a part of the determining.

According to various example embodiments, the processor may be configured to check whether the first notification and the second notification have been received by the electronic device within a specified period of time, as at least a part of the determining.

According to various example embodiments, the processor may be configured to check whether the first notification and the second notification correspond to the same application (i.e., check whether they are generated by the same application), as at least a part of the determining.

According to various example embodiments, the processor may be configured to when the first notification and the second notification do not match with each other, provide a first output signal corresponding to the first notification and a second output signal corresponding to the second notification through the output device or the external output device.

According to various example embodiments, the electronic device may further include a memory (e.g., the memory 230 of FIG. 2 or the memory 330 of FIG. 3) for storing first setting information corresponding to the first external electronic device or second setting information corresponding to the second external electronic device, and the processor may be configured to at least pause the outputting based at least on the first setting information or the second setting information.

According to various example embodiments, the processor may be configured to output, as a sound signal, at least a portion of the output signal, as at least a part of the outputting.

According to various example embodiments, the output device may include a speaker, and the processor may be configured to output at least a part of the sound signal through the speaker, as at least a part of the outputting.

According to various example embodiments, the processor may be configured to output, as visual data, at least a portion of the output signal, as at least a part of the outputting.

According to various example embodiments, the output device may include a display (e.g., the display 260 of FIG. 2 or the display 360 of FIG. 3), and the processor may be configured to output at least a part of the visual data through the display, as at least a part of the outputting.

According to various example embodiments, the processor may be configured to identify first state information corresponding to the first external electronic device and second state information corresponding to the second external electronic device, and select (or determine) the selected notification based at least on the first state information or the second state information.

According to various example embodiments, the processor may be configured to identify strength information of a signal corresponding to a notification, performance information, battery information or application running information, as at least a part of corresponding state information among the first state information and the second state information.

According to various example embodiments, the processor may be configured to transmit a message of requesting to stop notification transmission during at least a specified period of time to an external electronic device having transmitted the non-selected notification to the electronic device among the first external electronic device or the second external electronic device, by using the communication circuitry.

Figure 5:
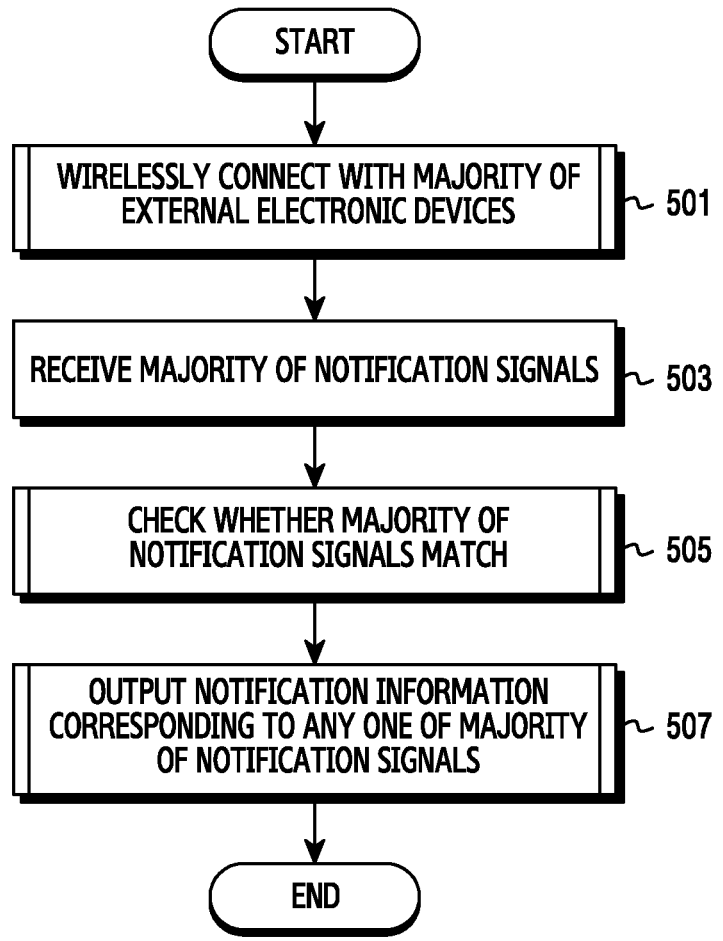
FIG. 5 illustrates a flowchart of an example of providing a notification in an electronic device according to various example embodiments.
Figure 6A:
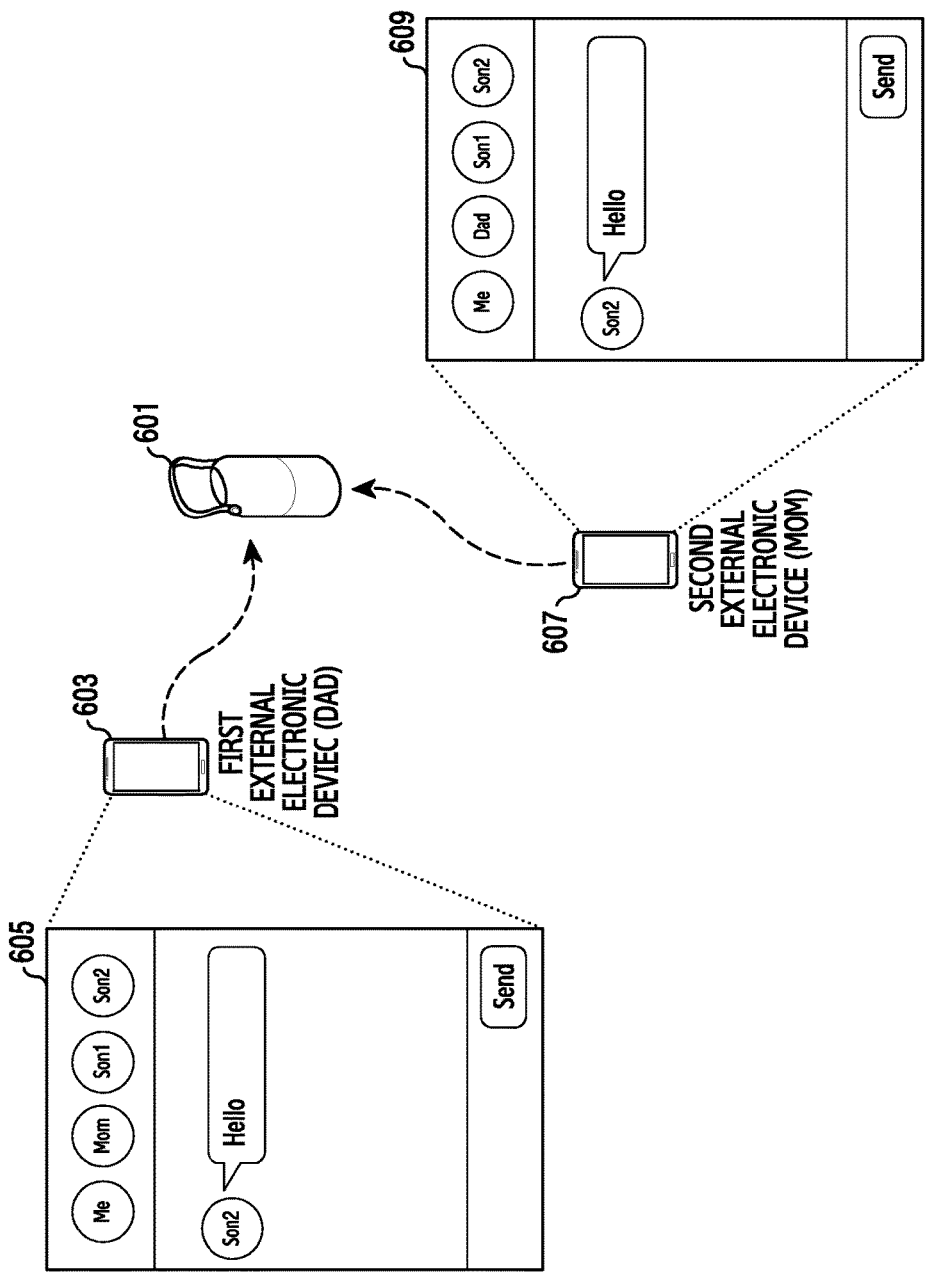
FIG. 6A to FIG. 6B illustrate an example of receiving a notification signal in an electronic device according to various example embodiments.
Figure 6B:
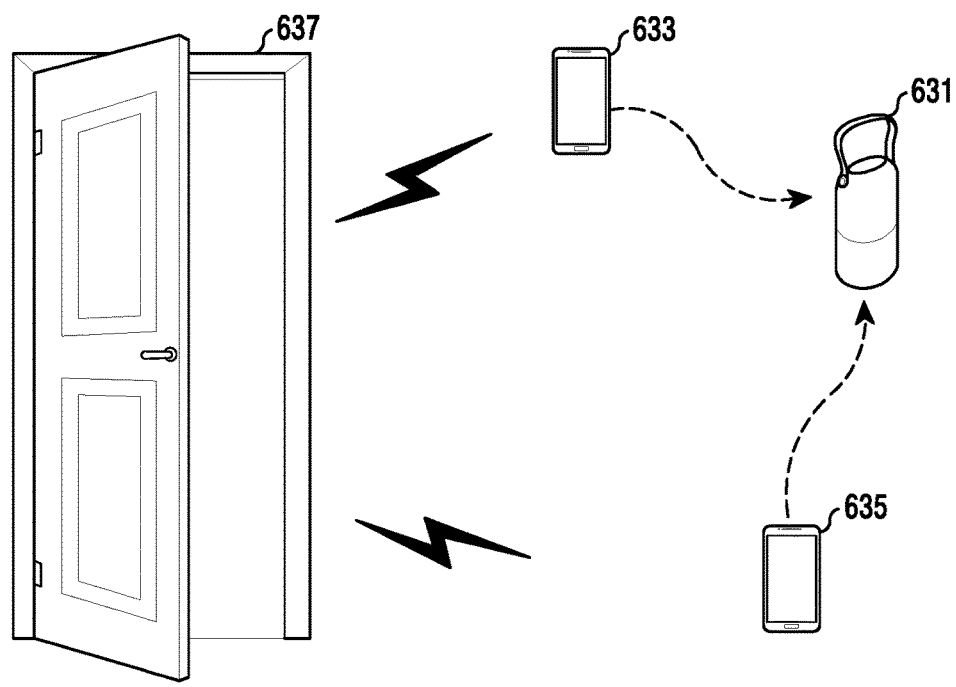

FIG. 5 illustrates a flowchart of an example of providing a notification in an electronic device according to various example embodiments. FIG. 6A to FIG. 6B illustrate an example of receiving a notification signal in the electronic device according to various example embodiments. In the following description, the electronic device may, for example, include at least one of the electronic device 101 of FIG. 1, the electronic device 201 of FIG. 2, and/or the electronic device 301 of FIG. 3.

Referring to FIG. 5, in operation 501, the electronic device may wirelessly connect with at least one external electronic device (e.g., 103, 105, 107, 202, 204, 206, 603, 607). For example, a processor (e.g., the processor 220 or 310) of the electronic device (e.g., the electronic device 201 or 301) may control a communication interface (e.g., the communication interface 270) so that a beacon signal for detecting at least one external electronic device (e.g., the first external electronic device 103, the second external electronic device 105, and/or the third external electronic device 107) located around the electronic device may be broadcasted. The processor may detect the at least one external electronic device located around the electronic device based on a response signal responsive to the broadcasted beacon signal. The processor may control the communication interface to perform wireless communication (e.g., short-range communication) with the detected at least one external electronic device.

In operation 503, the electronic device (e.g., 101, 201, 301, 601) may receive a majority of notification signals from the at least one external electronic device (e.g., 103, 105, 107, 202, 204, 206, 603, 607). For example, the processor may receive a first notification signal from a first external electronic device and receive a second notification signal from a second external electronic device, via the communication interface. In this case, the external electronic device may forward a notification signal to the electronic device in response to receiving the notification signal such as a SMS message, a chatting message, a SNS notification, an advertisement message, an IoT message or the like from a source device (e.g., the server 206 of FIG. 2). According to an example embodiment, the notification signal received from the external electronic device may, as in Table 1 below, include at least a part of device identification information for identifying the external electronic device having transmitted the notification signal, user identification information for identifying a user of the external electronic device having transmitted the notification signal, notification identification information for identifying notification information corresponding to the notification signal, command information for output of the notification information corresponding to the notification signal, supplementary information, and a remark.

TABLE 1

Example Notification Signal

| | |
|---|---|
| Device identification information | DEVICE UUID |
| | DEVICE IMEI |
| | DEVICE NUMBER |
| User identification information | USER ID |
| Notification identification information | NOTIFICATION TYPE |
| | TIME STAMP |
| | CONTENTS |
| | APPLICATION ID |
| | MESSAGE ID |
| | GROUP ID |
| Command information | VOICE VOLUME |
| | VOICE TYPE |
| | IS READ |
| | IS SHOW |
| | TEXT SIZE |
| | DURATION |
| | REPEAT TIME |
| Supplementary information | MEMBER LIST |
| Remark | EXTRA AREA |

In operation 505, the electronic device may check whether the majority of notification signals match with one another. For example, the processor may check whether the content of the first notification signal received from the first external electronic device and the second notification signal received from the second external electronic device are the same as each other, by analyzing one or more of a type of a notification signal received within a specified period of time, sender information, sending time information, receiving time information, text substance or an image shape. For example, as in FIG. 6A, an electronic device 601 may receive, within a specified period of time, a group chatting message from each of a first external electronic device 603 that is joining a first group chatting room 605 and a second external electronic device 607 that is joining a second group chatting room 609. The electronic device 601 may analyze at least a part of an ID of the group chatting room of the received group chatting message, sender information, information of a converser who belongs to the group chatting room, or message substance. The electronic device 601 may identify that the received respective group chatting messages are the same message based on the analysis result. For another example, as in FIG. 6B, when a first external electronic device 633 and a second external electronic device 635 have received IoT messages indicating that a door is open from a sensor 637 installed in the door, and have forwarded the received IoT messages to an electronic device 631, the electronic device 631 may analyze at least a part of sender information of the IoT messages received within a specified period of time, a sending time, and/or message substance. A processor (e.g., the processor 220 or 310) of the electronic device 601/631 may identify that the received respective IoT messages are the same message based on the analysis result.

In operation 507, the electronic device may output notification information corresponding to any one of the majority of notification signals, in response to identifying that the majority of notification signals match with one another. For example, the processor may select any one of the majority of notification signals based on state information (e.g., battery information, performance information, and/or application running information) of the external electronic devices having transmitted the majority of notification signals, signal strengths (e.g., received signal strength indication (RSSI)) of the notification signals, the receiving time of the notification signals, or the like. The processor may output notification information corresponding to the selected notification signal. For instance, the processor may control at least one of a speaker and/or display to output the content of the notification signal. For instance, the processor may control at least one of the speaker and/or the display to output a preset message or notification sound of indicating that the notification signal is received. For instance, the processor may light on/off a LED so that a user may recognize that the notification signal is received. For instance, the processor may provide the notification signal to an external output device operatively coupled (e.g., wirelessly or wiredly connected) with the electronic device so that notification information corresponding to the notification signal may be outputted through the external output device. The processor may disregard a non-selected notification signal so that notification information corresponding to the notification signal may not be outputted.

The above description has been made in which, in example embodiments, the electronic device detects the external electronic device(s) based on a response signal transmitted from the external electronic device(s) having received the broadcasted beacon signal, but according to various example embodiments, the electronic device may detect the external electronic device(s) by receiving a beacon signal broadcasted from the external electronic device(s). In this case, the electronic device may transmit a response signal responsive to the beacon signal to the external electronic device, and wirelessly connect with the external electronic device.

The above description has been made in which, in example embodiments, after wirelessly connecting with the majority of external electronic devices, the electronic device receives the majority of notification signals, but according to various example embodiments, in response to reception of a notification signal, the electronic device may search a nearby-located external electronic device and wirelessly connect with the external electronic device as well. For example, when a group chatting message has been received from an external electronic device, the processor (e.g., the processor 220 or 310) of the electronic device (e.g., the electronic device 101, 201, 301, 601, or 631) may control the communication interface (e.g., the communication interface 270) to output a beacon signal for detecting a nearby-located external electronic device(s). The processor may detect the external electronic device(s) based on a response signal to the beacon signal. The processor may control the communication interface to be wirelessly connected with the detected external electronic device(s).

The above description has been made in which, in example embodiments, the electronic device checks whether the contents of a majority of notification signals having been received by the electronic device within a specified period of time (e.g., 3 seconds) are the same as one another, but according to various example embodiments, the electronic device may check whether the majority of notification signals received within the specified period of time and the contents of the notification signals corresponding to the notification signals outputted within the specified period of time (e.g., 3 seconds) are the same as one another. For example, when having received a majority of IoT messages from external electronic devices, the processor (e.g., the processor 220 or 310) of the electronic device (e.g., the electronic device 201 or 301) may determine whether message substance of the received majority of IoT messages and message substance outputted through the speaker or display (e.g., the display 260) within the specified period of time are the same as one another as well.

Figure 7:
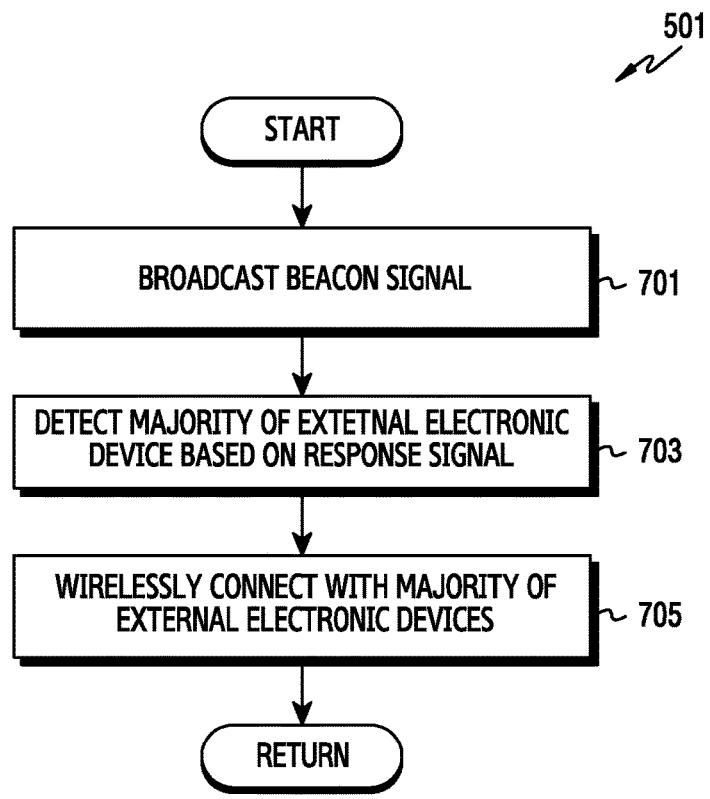
FIG. 7 illustrates a flowchart of performing communication connection with an external electronic device in an electronic device according to various example embodiments.

FIG. 7 illustrates a flowchart of performing communication connection with an external electronic device in an electronic device (e.g., the electronic device 101, 201, 301, 601, or 631) according to various example embodiments. The following description is made for an operation of wirelessly connecting with a majority of external electronic devices in operation 501 of FIG. 5. In the following description, the electronic device may, for example, include at least one of the electronic device 101 of FIG. 1, the electronic device 201 of FIG. 2 or the electronic device 301 of FIG. 3.

Referring to FIG. 7, in operation 701, the electronic device may broadcast a beacon signal. For example, a processor (e.g., the processor 220 or 310) of the electronic device (e.g. the electronic device 201 or 301) may check whether a preset cycle arrives. When the preset cycle has arrived, the processor may broadcast a beacon signal for searching an external electronic device via a communication interface (e.g., the communication interface 270). In this case, the processor may change a search range by adjusting a strength of the beacon signal. For example, the processor may decrease a search range for the external electronic device(s) by broadcasting the beacon signal at a weak strength. For another example, the processor may increase the search range for the external electronic device(s) by broadcasting the beacon signal at a strong strength.

In operation 703, the electronic device may detect a majority of external electronic devices based on a response signal. For example, the processor may receive unique identification numbers (e.g., MAC addresses) that are broadcasted from the majority of external electronic devices. The processor may detect the majority of external electronic devices located around the electronic device based on the unique identification numbers. According to an example embodiment, when the electronic device includes a display, the processor may control the display to output information related with the detected external electronic device. For example, by using information stored in a memory (e.g., the memory 230), the processor may identify identification information such as a model name of the external electronic device having broadcasted the unique identification number, a user name, a user contact, etc. The processor may control the display (e.g., the display 260) to output the identification information, thereby providing the information related with the detected external electronic device to a user.

In operation 705, the electronic device may wirelessly connect with the majority of external electronic devices. For example, the processor may control the communication interface to perform short-range communication (e.g., WiFi, Bluetooth, etc.) with the external electronic device having broadcasted the unique identification number.

Figure 8:
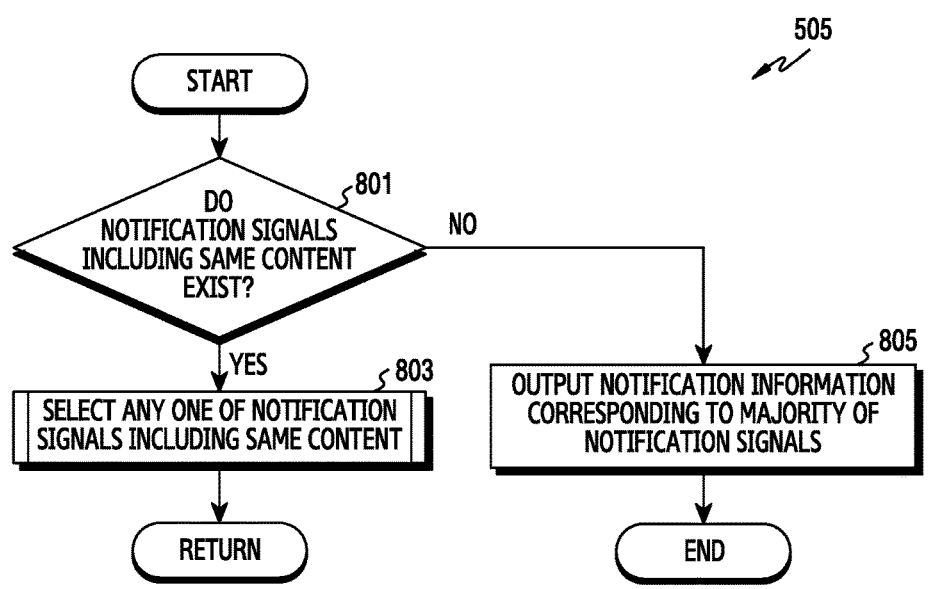
FIG. 8 illustrates a flowchart of selecting any one of a majority of notification signals from at least one external electronic device in an electronic device according to various example embodiments.

FIG. 8 illustrates a flowchart of selecting any one of a majority of notification signals received from at least one external electronic device in an electronic device (e.g., the electronic device 101, 201, 301, 601, or 631) according to various example embodiments. The following description is made for an operation of checking whether a majority of notification signals match with one another in operation 505 of FIG. 5. In the following description, the electronic device may, for example, include at least one of the electronic device 101 of FIG. 1, the electronic device 201 of FIG. 2, or the electronic device 301 of FIG. 3.

Referring to FIG. 8, in operation 801, the electronic device may determine whether notification signals including the same content exist and have been received. For example, a processor (e.g., the processor 220 or 310) of the electronic device (e.g., the electronic device 201 or 301) may determine whether the notification signals including the same content exist based on at least a part of types of a majority of the notification signals received within a specified period of time (e.g., 3 seconds) (or a selected time), sender information, sending time information, receiving time information, or a type of an application having generated the notification signals. For instance, when having received a second group chatting message within the specified period of time (e.g., 3 seconds) after having received a first group chatting message, the processor may identify at least one of an ID of a group chatting room of each of the first group chatting message and the second group chatting message, sender information, information of a converser who belongs to the group chatting room, or message substance. The processor may determine whether the first group chatting message includes the same content as the second group chatting message based on the identified information. For instance, when having received a second advertisement message within a specified period of time after having received a first advertisement message, the processor may identify at least one of sender information of each of the first advertisement message and the second advertisement message, a sending time, or message substance. The processor may determine whether the first advertisement message and the second advertisement message include the same content based on the identified information. For instance, when having received a second text message within a specified period of time after having received a first text message, the processor may determine whether applications having generated the first text message and the second text message are the same as each other. When the applications having generated the first text message and the second text message are the same as each other, the processor may identify at least one of sender information of each of the first text message and the second text message, a sending time, or message substance, thereby determining whether the first text message and the second text message include the same content. Here, the specified period of time may be changed into a different value according to a user's taste or convenience.

In operation 803, when the notification signals including the same content exist, the electronic device may select any one of the notification signals including the same content. For example, the processor may receive state information (e.g., one or more of battery information, performance information, application running information, etc.) from the majority of external electronic devices having transmitted the notification signals including the same content. The processor may select one of the external electronic devices having transmitted the notification signals including the same content based on the state information of the external electronic devices. For instance, the processor may select a notification signal received from an external electronic device having the highest battery level among the external electronic devices having transmitted the notification signals including the same content. For another example, the processor may select a notification signal received from an external electronic device having the highest processor processing capability among the external electronic devices having transmitted the notification signals including the same content. For further example, the processor may identify a signal strength of each of the notification signals including the same content. The processor may select a notification signal of the highest signal strength. For yet another example, the processor may identify a receiving time of each of the notification signals including the same content. The processor may select a firstly received notification signal among the notification signals including the same content.

According to an example embodiment, when having selected any one of the notification signals including the same content, the processor may transmit a signal related with a notification signal transmission authority to the external electronic device having transmitted the notification signal including the same content. For instance, the processor may transmit a signal granting a notification signal transmission authority to the external electronic device having transmitted the selected notification signal, and transmit a signal withdrawing the notification signal transmission authority to an external electronic device(s) having transmitted a non-selected notification signal. For instance, the processor may transmit the signal granting the transmission authority only to the external electronic device having transmitted the selected notification signal. For instance, the processor may transmit the signal withdrawing the notification signal transmission authority only to the external electronic device(s) having transmitted the non-selected notification signal. The external electronic device having transmitted the notification signal selected by the electronic device may transmit, to the electronic device, a notification signal received from a source device. Upon receiving a notification signal including the same identification information as identification information (e.g., message ID) of the notification signal not selected or a notification signal transmitted from the same sender as a sender of the notification signal not selected by the electronic device, the external electronic device having transmitted the notification signal not selected by the electronic device may not transmit the corresponding notification signal to the electronic device.

In operation 805, when the notification signals including the same content do not exist (e.g., have not been received by the electronic device within a predetermined period of time), the electronic device may output notification information corresponding to a majority of notification signals. For example, the electronic device may control the communication interface to transmit the majority of notification signals to an output device(s) wirelessly or wiredly connected with the electronic device, based on a receiving time of the majority of notification signals. For another example, the processor may control the speaker to output a notification sound notifying that each notification signal is received based on the receiving time of the majority of notification signals. For further example, the processor may control the speaker to output the contents of the majority of notification signals based on the receiving time of the majority of notification signals. According to an example embodiment, after changing notification setting of the electronic device based on a notification setting value of the external electronic device having transmitted each notification signal, the processor may control the speaker to output the notification signal according to the changed notification setting.

The above description has been made for, before outputting the notification information corresponding to the notification signal, transmitting the signal granting the notification signal transmission authority or the signal withdrawing the notification signal transmission authority to each external electronic device, but according to various example embodiments, after outputting notification information corresponding to any one notification signal selected among the notification signals including the same content, the electronic device may transmit a signal related with the notification signal transmission authority to each external electronic device as well.

Figure 9:
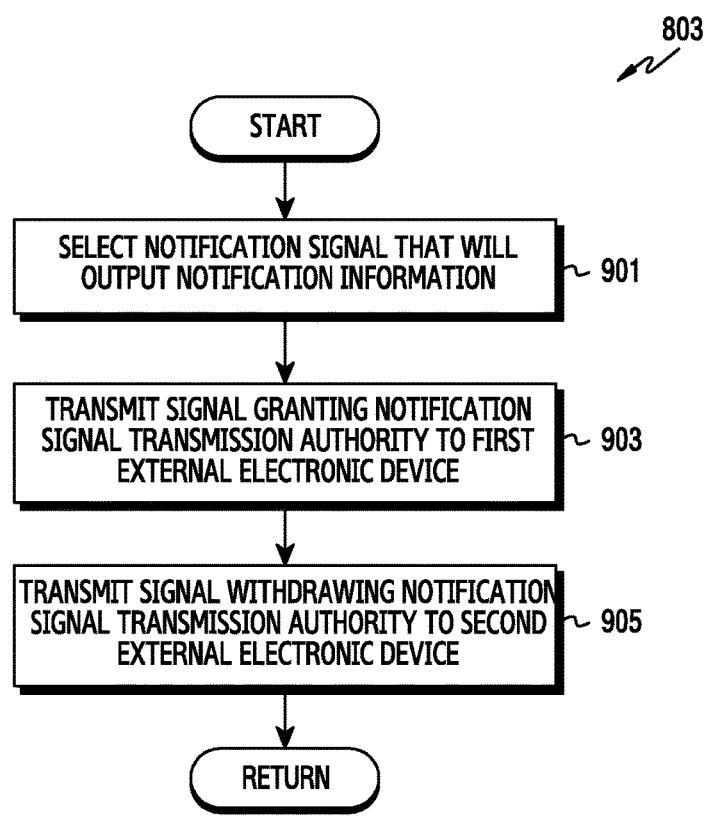
FIG. 9 illustrates a flowchart of selecting any one of notification signals including the same content in an electronic device according to various example embodiments.

FIG. 9 illustrates a flowchart of selecting any one of notification signals including the same content in an electronic device according to various example embodiments. The following description is made for an operation of selecting any one of notification signals including the same content in operation 803 of FIG. 8. In the following description, the electronic device may, for example, include at least one of the electronic device 101 of FIG. 1, the electronic device 201 of FIG. 2, or the electronic device 301 of FIG. 3.

Referring to FIG. 9, in operation 901, the electronic device (e.g., the electronic device 101, 201, 301, 601, or 631) may select a notification signal that will output notification information. For example, when the content of a first notification signal received from a first external electronic device (e.g., the first external electronic device 103 of FIG. 1) and the content of a second notification signal received from a second external electronic device (e.g., the second external electronic device 105 of FIG. 1) are the same as each other, a processor (e.g., the processor 220 or 310) of the electronic device (e.g., the electronic device 101, 201, 301, 601, or 631) may identify state information (e.g., one or more of battery information, performance information, application running information, etc.) of each of the first external electronic device and the second external electronic device. The processor may compare the state information of the first external electronic device and the state information of the second external electronic device, to select any one of the first notification signal and the second notification signal. For instance, when a battery level of the first external electronic device is greater than a battery level of the second external electronic device, the processor may select the first notification signal. For instance, when a processor processing speed of the first external electronic device is faster than a processor processing speed of the second external electronic device, the processor may select the first notification signal. For instance, when the first external electronic devices is not executing an application (e.g., a message application) corresponding to the first notification signal, and the second external electronic device is executing an application corresponding to the second notification signal, the processor may determine that a user of the first external electronic device fails to recognize that the first notification signal is received, and thus select the first notification signal. As another example, when the content of the first notification signal received from the first external electronic device and the content of the second notification signal received from the second external electronic device are the same as each other, the processor may identify a signal strength of the first notification signal and a signal strength of the second notification signal. When the signal strength of the first notification signal is stronger than the signal strength of the second notification signal, the processor may select the first notification signal. For further example, the processor may identify a receiving time of the first notification signal and a receiving time of the second notification signal. When the receiving time of the first notification signal is faster than the receiving time of the second notification signal, the processor may select the first notification signal. According to an example embodiment, in response to selection of the first notification signal, the processor may determine the first external electronic device as a device that will be granted a notification signal transmission authority, and disregard the non-selected second notification signal.

In operation 903, the electronic device may transmit a signal granting the notification signal transmission authority to a first external electronic device. For example, the processor may control the communication interface (e.g., the communication interface 270) to transmit the signal granting the notification signal transmission authority to the first external electronic device. In this case, in response to reception of the signal granting the notification signal transmission authority, the first external electronic device may transmit, to the electronic device, all notification signals received from a notification source device.

In operation 905, the electronic device may transmit a signal withdrawing the notification signal transmission authority to a second external electronic device. For example, the processor may control the communication interface to transmit the signal withdrawing the notification signal transmission authority to the second external electronic device. In this case, in response to reception of the signal withdrawing the notification signal transmission authority, the second external electronic device may selectively transmit a subsequently received notification signal to the electronic device. For instance, the second external electronic device may not transmit a notification signal received from the same sender as a sender of the second notification signal, to the electronic device during a preset time. For another example, when a notification signal including the same identification ID (e.g., the same advertisement message, a message of the same group chatting room, etc.) as the second notification signal is received, the second external electronic device may not transmit the corresponding notification signal to the electronic device.

While examples in the above description have been made in which the electronic device selects the notification signal in consideration of the state information of the external electronic device, according to various example embodiments, the electronic device may instead or in addition select the notification signal based on setting information of the external electronic device(s). For example, when the content of the first notification signal received from the first external electronic device (e.g., the first external electronic device 103) and the content of the second notification signal received from the second external electronic device (e.g., the second external electronic device 105) are the same as each other, the processor (e.g., the processor 220 or 310) of the electronic device (e.g., the electronic device 201 or 301) may identify setting information of the first external electronic device and the second external electronic device. The processor may select the notification signal transmitted from the external electronic device of which the setting information has not been set as third-party notification block among the first external electronic device and the second external electronic device. Here, the setting information is information used for selectively outputting notification information, and may include third-party notification block, a preference group, a block group, or the like. The third-party notification block is for limiting the output of the notification information based on existence or non-existence of an external electronic device around an electronic device. The preference group includes a list of a specific external electronic device which permits the output of notification information in a state of having been set as the third-party notification block. The block group includes a list of a specific external electronic device which limits the output of notification information in a state of not having been set as the third-party notification block, or the like.

According to various example embodiments, the electronic device may omit some of operation 901 to operation 905. For example, after performing operation 903 of transmitting the signal granting the notification signal transmission authority to the first external electronic device, the processor (e.g., the processor 220 or 310) of the electronic device (e.g., the electronic device 201 or 301) may not perform operation 905 of transmitting the signal withdrawing the notification signal transmission authority to the second external electronic device as well. In this case, when the signal granting the notification signal transmission authority is not received from the electronic device during a constant period of time after the second external electronic device transmits the notification signal, the second external electronic device may selectively provide a received notification to the electronic device. For another example, if the first external electronic device is granted the notification signal transmission authority, the processor may omit operation 903 of transmitting the signal granting the notification signal transmission authority to the first external electronic device, and perform operation 905 of transmitting the signal withdrawing the notification signal transmission authority to the second external electronic device as well.

According to various example embodiments, after setting a notification signal transmission authority, the electronic device may reset the notification signal transmission authority according to change or non-change of the external electronic device located around the electronic device as well. For example, the processor (e.g., the processor 220 or 310) of the electronic device (e.g., the electronic device 201 or 301) may periodically scan the external electronic device(s) located around the electronic device through the communication interface (e.g., the communication interface 270). When the external electronic device granted the transmission authority is no longer searched, the processor may again perform operation 901 of FIG. 9, to again select a notification signal that will output notification information (again determine an external electronic device that will be granted the notification signal transmission authority). For another example, if a notification signal is received from an external electronic device, the processor may search an external electronic device located around the electronic device through the communication interface. When the external electronic device granted the notification signal transmission authority is no longer searched, the processor may again perform operation 901 of FIG. 9, to again select a notification signal that will output notification information (again determine an external electronic device that will be granted a notification signal transmission authority).

Figure 10:
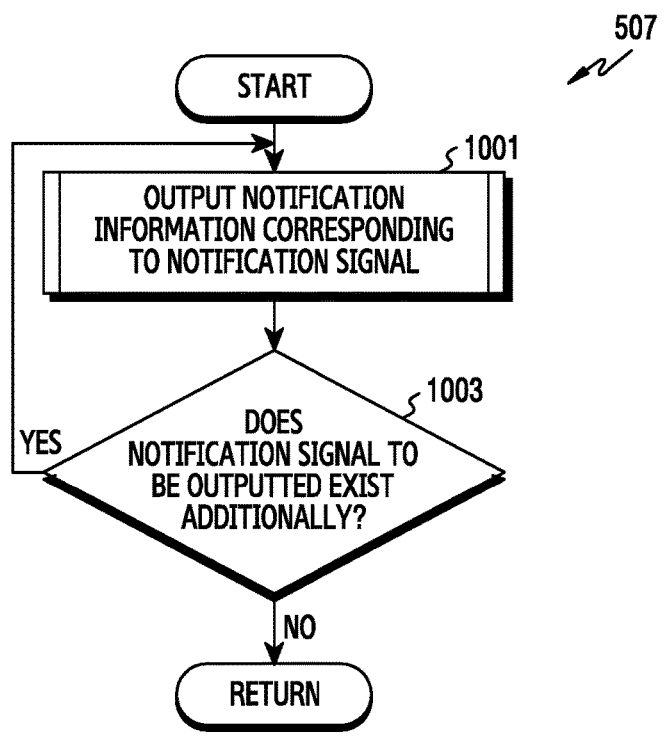
FIG. 10 illustrates a flowchart of outputting notification information corresponding to a notification signal in an electronic device according to various example embodiments.

FIG. 10 illustrates a flowchart of outputting notification information corresponding to a notification signal in an electronic device according to various example embodiments. The following description is made for an operation of outputting notification information corresponding to any one of a majority of notification signals in operation 507 of FIG. 5. In the following description, the electronic device may, for example, include at least one of the electronic device 101 of FIG. 1, the electronic device 201 of FIG. 2, or the electronic device 301 of FIG. 3.

Referring to FIG. 10, in operation 1001, the electronic device (e.g., the electronic device 101, 201, 301, 601, or 631) may output notification information corresponding to a notification signal. For example, a processor (e.g., the processor 220 or 310) of the electronic device (e.g. the electronic device 201 or 301) may control the speaker to output a text of a group chatting message through a voice. For another example, the processor may control the speaker to output a voice such as "an advertisement message has been arrived" in order to inform that an advertisement message is received. For further example, the processor may control the speaker to output a preset warning sound in order to inform that an alert message is received.

In operation 1003, the electronic device may determine whether a notification signal to be outputted exists additionally. For example, when any one message among a majority of group chatting messages including the same content has been outputted, the processor may determine that a notification signal to be outputted does not exist additionally. For another example, when a group chatting message including the same content is received within a constant period of time (e.g., 3 seconds) after any one message among the majority of group chatting messages including the same content has been selected (or outputted), the processor may determine that the notification signal to be outputted does not exist additionally. For further example, when the substance of a first text message among the first text message and a second text message of mutually different substance has been outputted, the processor may determine that a notification signal to be outputted exists additionally. When the notification signal to be outputted exists additionally, the processor may again perform operation 1001 of outputting notification information corresponding to the notification signal.

Examples in the above description have been made in which the electronic device outputs the notification information by using the speaker, but according to various example embodiments, when the electronic device has a display, the electronic device may output the notification information through the display instead or in addition. For example, the processor (e.g., the processor 220 or 320) of the electronic device (e.g., the electronic device 201 or 301) may control the display (e.g., the display 260) to output a notification message of notifying that the content of a selected notification signal or the selected notification signal is received. In this case, the processor may change output setting of the display based on a notification setting value of an external electronic device having transmitted notification information. For example, the processor may change at least a part of a text size for outputting notification information, a color, a scroll speed, a display position, or the number of times of repetition, based on the notification setting value of the external electronic device having transmitted the notification information.

Examples in the above description have been made in which the electronic device outputs the notification information by using the speaker included in the electronic device, but according to various example embodiments, the electronic device may output the notification information through an external output device (e.g., the speaker, the display or the like) operatively coupled (wirelessly or wiredly connected) with the electronic device as well.

Figure 11:
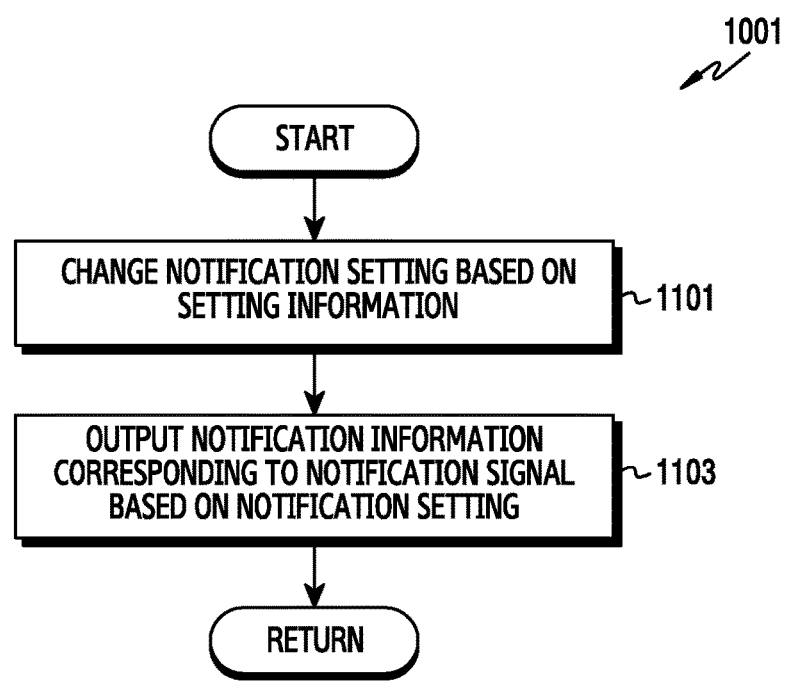
FIG. 11 illustrates a flowchart of outputting the content of a notification signal according to notification setting in an electronic device according to various example embodiments.
Figure 12:
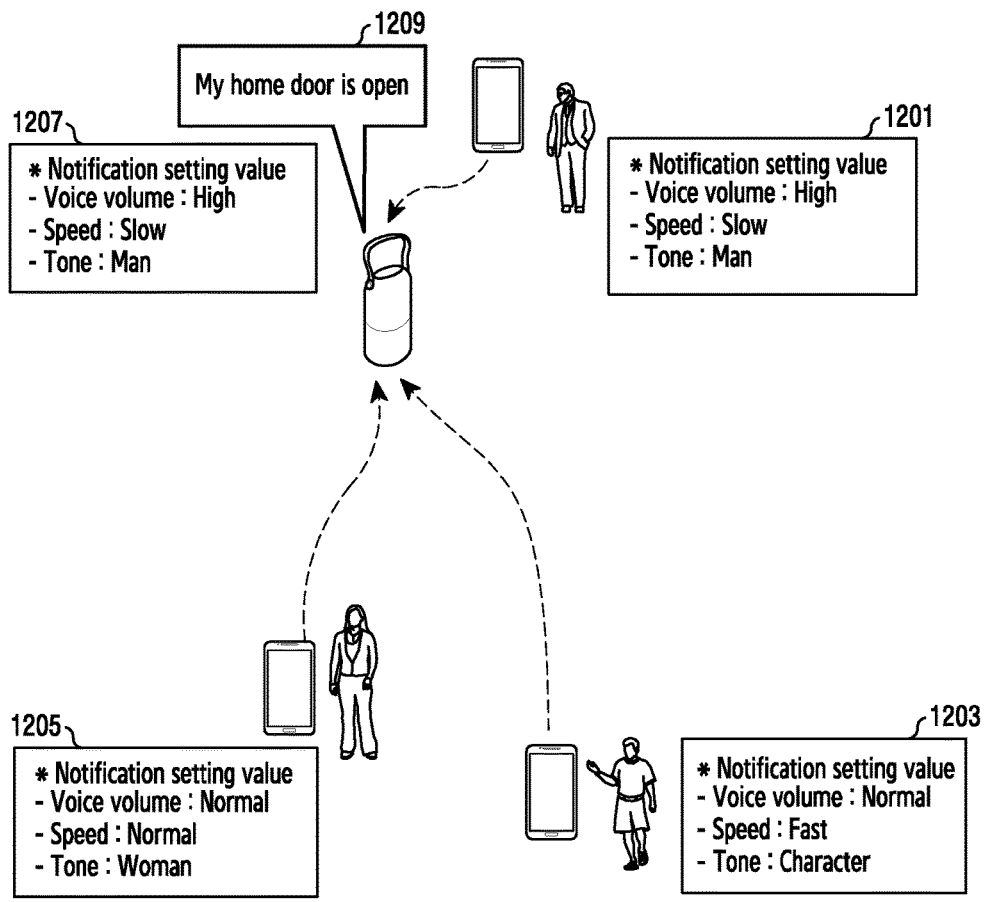
FIG. 12 illustrates an example of outputting the content of a notification signal according to notification setting in an electronic device according to various example embodiments.

FIG. 11 illustrates a flowchart of outputting the content of a notification signal according to notification setting in an electronic device according to various example embodiments. FIG. 12 illustrates an example of outputting the content of the notification signal according to the notification setting in the electronic device according to various example embodiments. The following description is made for an operation for outputting notification information corresponding to the notification signal in operation 1001 of FIG. 10. In the following description, the electronic device may, for example, include at least one of the electronic device 101 of FIG. 1, the electronic device 201 of FIG. 2, or the electronic device 301 of FIG. 3.

Referring to FIG. 11, in operation 1101, the electronic device (e.g., the electronic device 101, 201, 301, 601, or 631) may change notification setting based on a notification setting value of an external electronic device having transmitted a notification signal. For example, as in FIG. 12, when having selected an IoT message received from a first external electronic device 1201 among IoT messages of the same content ("My home door is open") received from the first external electronic device 1201, a second external electronic device 1203, and a third external electronic device 1205 wirelessly connected through a communication interface (e.g., the communication interface 270), a processor (e.g., the processor 220 or 310) of the electronic device (e.g., the electronic device 101, 201, 301, 601, or 631) may identify a notification setting value (i.e., voice volume: high, speed: slow, and/or tone: man) of the first external electronic device 1201. The processor may change notification setting of the electronic device to correspond to the identified notification setting value. Here, for example, the notification setting value may be included in a notification signal and transmitted to the electronic device. In this case, the processor may extract the notification setting value from the notification signal. For another example, the notification setting value may be separated from the notification signal and transmitted to the electronic device. For instance, the notification setting value may be transmitted to the electronic device at any one time point among a time point at which the electronic device and the external electronic device have performed communication connection, a time point before receiving the notification signal, or a time point after receiving the notification signal.

In operation 1103, the electronic device may output notification information corresponding to the notification signal based on the notification setting set in operation 1101. For example, as in FIG. 12, the processor may control the speaker to output (1207) the content ("My home door is open") of the IoT message received from the first external electronic device 1201 through a slow and loud man voice.

Examples in the above description have been made in which the electronic device changes the notification setting based on the notification setting value of the external electronic device corresponding to the selected notification signal, but according to various example embodiments, the electronic device may change the notification setting of the electronic device in consideration of notification setting values of all external electronic devices having transmitted notification signals including the same content as well. For example, as in FIG. 12, when having received the IoT messages of the same substance from the first external electronic device 1201, the second external electronic device 1203, and the third external electronic device 1205, the processor (e.g., the processor 220 or 310) of the electronic device (e.g., the electronic device 201 or 301) may identify age groups of users of the respective external electronic devices through the notification setting values of the respective external electronic devices. For instance, when user's age information has been included in the notification setting value, the processor may identify the age group of the user based on the user's age information. The processor may change notification setting of a speaker through a notification setting value of an external electronic device which has been identified as having the highest age group among the age groups of the users of the respective external electronic devices. For another example, as in FIG. 12, when receiving the IoT messages of the same substance from the first external electronic device 1201, the second external electronic device 1203, and the third external electronic device 1205, the processor may identify notification setting values of the respective external electronic device. The processor may combine the notification setting values of the respective external electronic devices, to change the notification setting. For example, the processor may set a loud and fast woman voice as the notification setting as well.

Figure 13:
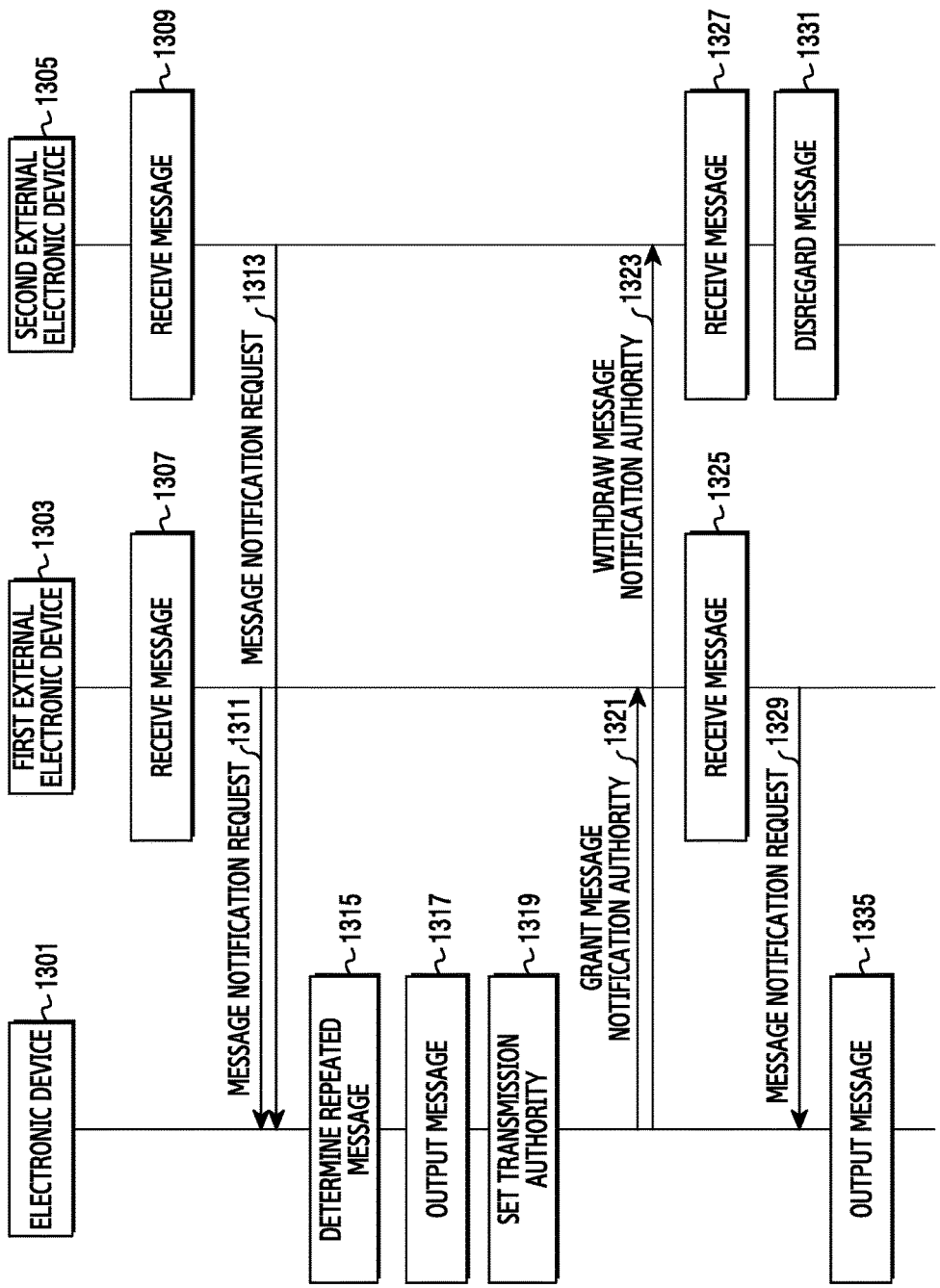
FIG. 13 illustrates a system for providing a notification according to various example embodiments.

FIG. 13 illustrates a system for providing a notification according to various example embodiments. In the following description, an electronic device may, for example, include at least one of the electronic device 101 of FIG. 1, the electronic device 201 of FIG. 2, or the electronic device 301 of FIG. 3.

Referring to FIG. 13, in operation 1307 and operation 1309, a first external electronic device 1303 and a second external electronic device 1305 each may receive a message (e.g., a text message, a group chatting message, an IoT message, an alert message, an advertisement message or the like). In operation 1311 and operation 1313, the first external electronic device 1303 and the second external electronic device 1305 each may transmit the received message to the electronic device 1301 to send a reception message notification request in response to the receiving of the message. In operation 1315, the electronic device 1301 (e.g., the electronic device 101, 201, 301, 601, or 631) may determine whether the repeated message has been received, by identifying text substance of the message received from the first external electronic device 1303 and text substance of the message received from the second external electronic device 1305. When the two received messages are the repeated messages, the electronic device 1301 may select any one message. For instance, the electronic device 1301 may select any one message based on state information (e.g., battery information, performance information, application running information, etc.) of the first external electronic device 1303 and state information of the second external electronic device 1305. For instance, the electronic device 1301 may select any one message based on a signal strength of the message received from the first external electronic device 1303 and a signal strength of the message received from the second external electronic device 1305. In operation 1317, when having selected the message received from the first external electronic device 1303, the electronic device 1301 may output the corresponding message. In operation 1319, as the message received from the first external electronic device 1303 is selected, the electronic device 1301 may determine the first external electronic device 1303 as a device that will be granted a message notification authority, and determine the second external electronic device 1305 as a device that will have withdrawn the message notification authority. In operation 1321, the electronic device 1301 may transmit a signal granting the message notification authority to the first external electronic device 1303. In operation 1323, the electronic device 1301 may transmit a signal withdrawing the message notification authority to the second external electronic device 1305. In operation 1325, the first external electronic device 1303 may receive a message. In operation 1329, the first external electronic device 1303 may transmit the received message to the electronic device 1301 to send a message notification request, based on the message notification authority. In operation 1327, the second external electronic device 1305 may receive a message. In operation 1331, the second external electronic device 1305 may not transmit the received message to the electronic device 1301 in order to send a message notification request, based on the message notification authority or may disregard the message. For example, the second external electronic device 1305 may disregard the received message without transmitting the received message to the electronic device 1301 during a constant period of time (e.g., 10 minutes). For another example, the second external electronic device 1305 may disregard a message transmitted from the same sender as a sender of an earlier transmitted message. In operation 1335, the electronic device 1301 may output the received message through at least one of the speaker or display in response to the message notification request received from the first external electronic device 1303.

Examples in the above description have been made in which after outputting the message, the electronic device 1301 determines the device that will be granted the message notification authority, but according to various example embodiments, after determining the device that will be granted the message notification authority, the electronic device 1301 may output the message received from the external electronic device granted the notification authority as well. For example, when a message received from the first external electronic device 1303 has been selected, the electronic device 1301 may determine the first external electronic device 1303 as the device that will be granted the message notification authority. The electronic device 1301 may output the message received from the first external electronic device 1303.

Figure 14:
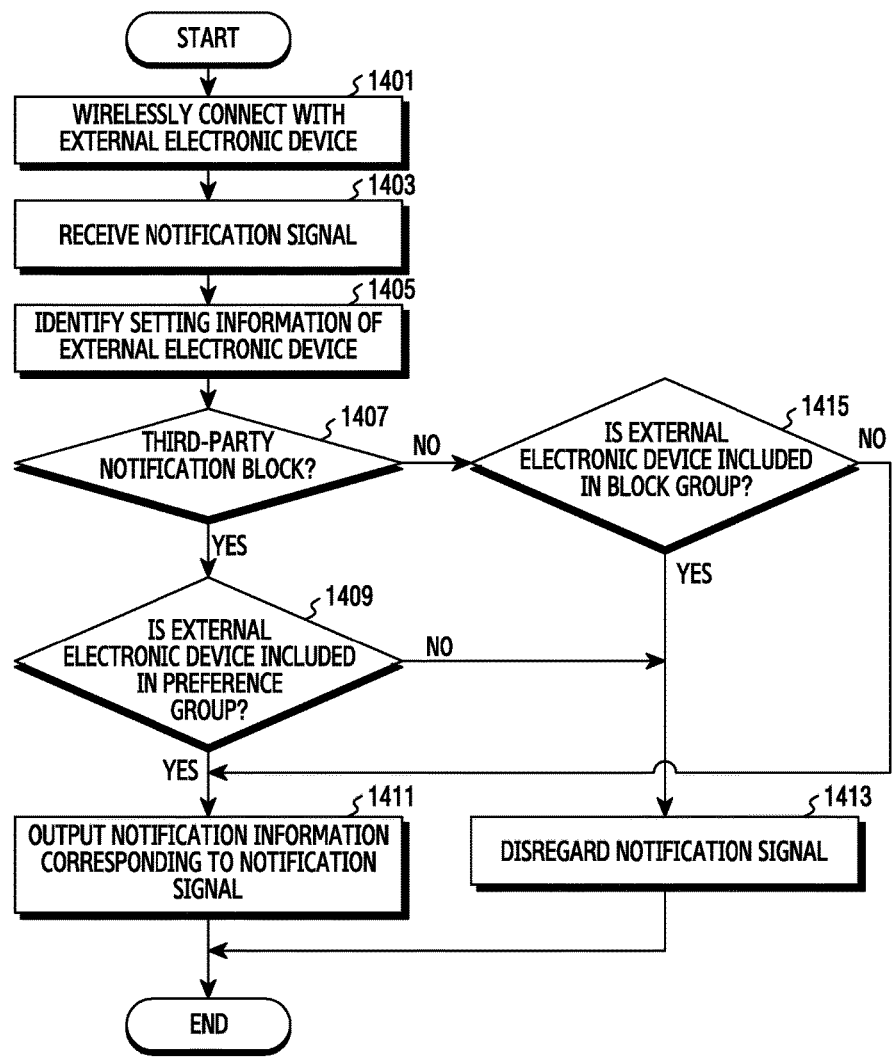
FIG. 14 illustrates a flowchart of another example of providing a notification in an electronic device according to various example embodiments.

FIG. 14 illustrates a flowchart of another example of providing a notification in an electronic device according to various example embodiments. In the following description, the electronic device may, for example, include at least one of the electronic device 101 of FIG. 1, the electronic device 201 of FIG. 2, or the electronic device 301 of FIG. 3.

Referring to FIG. 14, in operation 1401, the electronic device (e.g., the electronic device 101, 201, 301, 601, 631, or 1301) may wirelessly connect with an external electronic device. For example, a processor (e.g., the processor 220 or 310 of FIG. 2) of the electronic device (e.g., the electronic device 201 or 301) may control a communication interface (e.g., the communication interface 270) so that a beacon signal for detecting an external electronic device (e.g., the external electronic device 103, 105, or 107) located around the electronic device may be broadcasted. When a response signal to the broadcasted beacon signal has been received, the processor may control the communication interface to perform wireless communication with the external electronic device having transmitted the response signal.

In operation 1403, the electronic device may receive a notification signal from the external electronic device(s). For example, the processor may receive a SMS message, a chatting message, an advertisement message, an alert message, or an IoT message from the external electronic device through the communication interface. According to an example embodiment, the notification signal received from the external electronic device may include at least a part of device identification information for identifying the external electronic device having transmitted the notification signal, user identification information for identifying a user of the external electronic device having transmitted the notification signal, notification identification information for identifying notification information corresponding to the notification signal, command information for output of the notification information corresponding to the notification signal, supplementary information, and a remark.

In operation 1405, the electronic device may identify setting information of the external electronic device(s). For example, the processor may identify the setting information included in the notification signal received from the external electronic device. For another example, if being communication connected with the external electronic device, the processor may receive a signal corresponding to the setting information from the external electronic device via the communication interface, and identify the setting information of the external electronic device. For further example, before or after the notification signal is transmitted from the external electronic device, the processor may receive a signal corresponding to the setting information via the communication interface, and identify the setting information of the external electronic device.

In operation 1407, the electronic device may determine whether the external electronic device has been set as third-party notification block based on the setting information of the external electronic device. For example, the processor may determine whether a mode of selectively providing a notification has been activated in the external electronic device based on the setting information of the external electronic device. When the mode of selectively providing the notification has been activated in the external electronic device, the processor may determine that the external electronic device has been set as the third-party notification block. When the mode of selectively providing the notification has been deactivated in the external electronic device, the processor may determine that the external electronic device has not been set as the third-party notification block.

In operation 1409, when the external electronic device has been set as the third-party notification block, the electronic device may determine whether at least one external electronic device communication connected with the electronic device is included in a preference group. For example, the processor may identify a list of external electronic devices wirelessly connected with the electronic device. The processor may identify the preference group from the setting information of the external electronic device having transmitted the notification signal. The processor may determine whether the list of the external electronic devices wirelessly connected with the electronic device is included in the preference group. Here, the preference group may include a list of a specific external electronic device which permits the output of notification information corresponding to a notification signal so that the notification information may be outputted, when the specific external electronic device exists around the electronic device in a state in which the electronic device has been set as the third-party notification block. For example, according to setting of a user of the external electronic device having transmitted the notification signal, the preference group may include information (e.g., a phone number) related with a portable terminal of a family member of the user.

In operation 1411, when the at least one external electronic device communication connected with the electronic device is included in the preference group, the electronic device may output notification information corresponding to the notification signal. For example, when the external electronic device has been set as the third-party notification block, and the electronic device has been wirelessly connected with the portable terminal of the family member of the user included in the preference group, the processor may control at least one of the speaker or display to output the notification information corresponding to the notification signal. In this case, the processor may change notification setting of the electronic device to correspond to a notification setting value of the external electronic device, and control at least one of the speaker or display to output the content of a received message according to the changed notification setting.

In operation 1413, when the at least one external electronic device wirelessly connected with the electronic device is not included in the preference group, the electronic device may disregard the notification signal. For example, when a list of external electronic devices wirelessly connected with the electronic device is not included in the preference group, the processor may disregard the received notification signal so that the notification signal may not be outputted. In this case, the processor may transmit a message of rejecting a request for output of the notification information corresponding to the notification signal, to the external electronic device having transmitted the notification signal.

In operation 1415, when the external electronic device has not been set as the third-party notification block, the electronic device may determine whether the external electronic device wirelessly connected with the electronic device is included in a block group. For example, when the mode of selectively providing the notification has not been activated in the external electronic device, the processor may identify the block group from the setting information of the external electronic device having transmitted the notification signal. The processor may determine whether a list of an external electronic device wirelessly connected with the electronic device is included in the block group. Here, the block group may include a list of a specific external electronic device which desires blocking to limit the output of notification information corresponding to a notification signal, when the specific external electronic device exists around the electronic device in a state in which the electronic device has not been set as the third-party notification block. For example, according to setting of a user of the external electronic device having transmitted the notification signal, the block group may include information (e.g., a phone number) related with a portable terminal of a fellow worker of the user. When the list of the external electronic device wirelessly connected with the electronic device is included in the block group, the processor may perform operation 1413 of disregarding the received notification signal. For example, when the electronic device has been set as the third-party notification block, and the portable terminal of the fellow worker included in the block group has been wirelessly connected with the electronic device, the processor may disregard a notification signal.

Examples in the above description have been made in which the electronic device determines whether to output a notification based on the setting information of the external electronic device having transmitted the notification signal, but according to various example embodiments, the electronic device may determine whether to output a notification based on not only the setting information of the external electronic device but also the notification signal received from the external electronic device. For example, the processor of the electronic device may determine whether a specific text (e.g., a loan, a deposit, etc.) has been included in a received message. When the specific text has been included, the processor may determine the received message as an advertisement message and disregard the received message. For another example, the processor may identify sender information of the received message, and determine whether the sender information satisfies a notification output condition included in the setting information of the external electronic device, and determine whether to output a notification as well.

According to various example embodiments, the electronic device may partly limit setting of the preference group and the block group so that the same external electronic device may not be included in both a list of external electronic devices included in the preference group and a list of external electronic devices included in the block group. For example, when a user will set a portable terminal of a family member as the block group in a state in which the portable terminal of the family member has been included in the preference group, the processor (e.g., the processor 220 or 310) of the electronic device (e.g., the electronic device 201 or 301) may limit the setting so that the portable terminal of the family member may not be set as the block group. In this case, the processor may provide a guidance sentence, a guidance voice, a vibration, etc. in order to notify the user that the portable terminal of the family member of the user has been included in the preference group.

Figure 15:
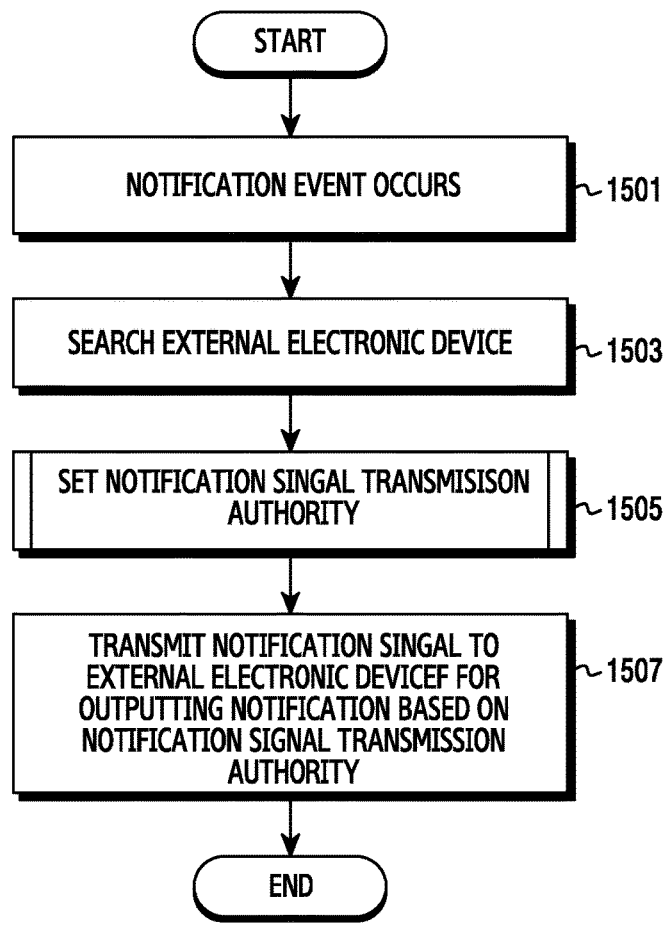
FIG. 15 illustrates a flowchart of an example of transmitting a notification signal to an external electronic device in an electronic device according to various example embodiments.

FIG. 15 illustrates a flowchart of transmitting a notification signal to an external electronic device in an electronic device according to various example embodiments. In the following description, the electronic device may, for example, include at least one of the external electronic device 103, 105 or 107 of FIG. 1, the electronic device 201 of FIG. 2, or the electronic device 301 of FIG. 3.

Referring to FIG. 15, in operation 1501, the electronic device (e.g., the first external electronic device 103 or the electronic device 201) may identify the occurrence of a notification event. For example, a processor (e.g., the processor 220 or 310) of the electronic device (e.g., the electronic device 201 or 301) may receive a notification signal such as a text message, a group chatting message, an IoT message, an alert message, an advertisement message, or the like from a notification source device (e.g., the server 206) through a communication interface (e.g., the communication interface 27). When the notification signal is received from the notification source device, the processor may determine that the notification event has occurred.

In operation 1503, the electronic device may search an external electronic device (e.g., the second external electronic device 105, the third external electronic device 107 or the external electronic device 202) having received a notification signal including the same content. For example, the processor may check whether the electronic device has been wirelessly connected with an external electronic device (e.g., the electronic device 101) for outputting a notification in response to the occurrence of the notification event. When the electronic device has been wirelessly connected with the external electronic device for outputting the notification, the processor may broadcast at least one of identification information (e.g., a message ID) of the notification signal or content information of the notification signal. The processor may search an external electronic device located around the electronic device based on identification information of a notification signal or content information of the notification signal, which is broadcasted from the external electronic device (e.g., the second external electronic device 105 and/or the third external electronic device 107). The processor may detect an external electronic device having received a notification signal including the same content, among the external electronic devices having been searched based on the identification information of the notification signals or the content information of the notification signals broadcasted from the searched external electronic devices. For another example, the processor may check whether the electronic device has been wirelessly connected with the external electronic device for outputting the notification in response to the occurrence of the notification event. When the electronic device has been wirelessly connected with the external electronic device for outputting the notification, the processor may control the communication interface (e.g., the communication interface 270) so that a beacon signal may be broadcasted. The processor may search the external electronic device located around the electronic device based on a response signal to the broadcasted beacon signal. The processor may determine whether an external electronic device having received a notification signal including the same content exists among the searched external electronic devices. For instance, when having received a group chatting room message, the processor may determine whether an electronic device of another user included in a group chatting room has been searched. When the electronic device of another user included in the group chatting room has been searched, the processor may determine that an external electronic device having received the same group chatting room message exists.

In operation 1505, the electronic device may set a notification signal transmission authority. For example, the processor may perform wireless connection with external electronic devices having received notification signals including the same content, and identify state information (e.g., battery information, performance information, application running information, etc.) of each electronic device. The processor may select one electronic device that will transmit a notification signal based on the state information. For instance, when a battery level of an electronic device is greater than those of external electronic devices having received group chatting messages including the same content, the processor may determine the electronic device as a device that will be granted a notification signal transmission authority, and transmit a signal withdrawing the notification signal transmission authority to the external electronic devices having received the group chatting messages including the same content. In this case, the external electronic device having received the group chatting message including the same content may disregard the notification signal based on reception of the signal withdrawing the notification signal transmission authority. For another example, the processor may perform wireless connection with external electronic devices having received messages including the same content, and identify message receiving time information in each external electronic device. When a message of an electronic device has been firstly received, the processor may determine the electronic device as a device that will be granted a notification signal transmission authority, and transmit a signal withdrawing the notification signal transmission authority to the external electronic device having received the message including the same content.

In operation 1507, the electronic device may transmit a notification signal to an external electronic device (e.g., the electronic device 101) for outputting a notification, based on the notification signal transmission authority. For example, when the electronic device has been granted the notification signal transmission authority, the processor may control the communication interface to transmit the notification signal to the external electronic device for outputting the notification. According to an example embodiment, after the external electronic device for outputting the notification changes notification setting of the external electronic device for outputting a notification to correspond to a notification setting value of the electronic device, the external electronic device for outputting the notification may output notification information corresponding to the notification signal according to the changed notification setting. For example, the notification setting value may be set as a different value every application included in the electronic device 301. According to an example embodiment, the notification signal that the electronic device transmits to the external electronic device for outputting the notification may include at least a part of device identification information for identifying the electronic device, user identification information for identifying a user of the electronic device, notification identification information for identifying notification information corresponding to the notification signal, command information for output of the notification information corresponding to the notification signal, supplementary information, and a remark.

Figure 16:
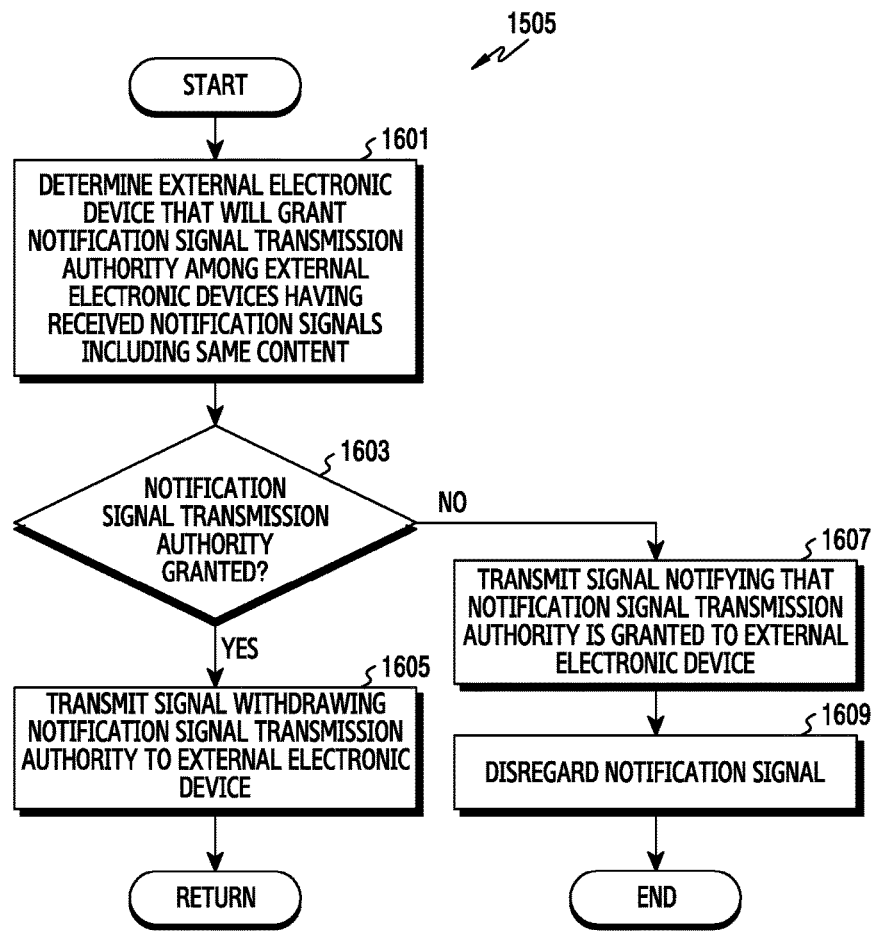
FIG. 16 illustrates a flowchart of setting a notification signal transmission authority in an electronic device according to various example embodiments.

FIG. 16 illustrates a flowchart of setting a notification signal transmission authority in an electronic device according to various example embodiments. The following description is made for an operation for setting the notification signal transmission authority in operation 1505 of FIG. 15. In the following description, the electronic device may, for example, include at least one of the external electronic device 103, 105 or 107 of FIG. 1, the electronic device 201 of FIG. 2, or the electronic device 301 of FIG. 3.

Referring to FIG. 16, in operation 1601, the electronic device (e.g., the first external electronic device 103 or the electronic device 201) may determine an external electronic device that will be granted a notification signal transmission authority among external electronic devices (e.g., the second external electronic device 105 and the third external electronic device 107) having received notification signals including the same content. For example, a processor (e.g., the processor 220 or 310) of the electronic device (e.g., the electronic device 201 or 301) may perform communication connection with the external electronic devices having received the notification signals including the same content through the communication interface (e.g., the communication interface 270), and identify state information such as battery information, application running information, etc. of the respective external electronic devices. The processor may determine an electronic device that will be granted a notification signal transmission authority based on the state information of the respective external electronic devices. For another example, the processor may perform communication connection with the electronic devices having received the notification signals including the same content through the communication interface, and identify a receiving time of the notification signal in each external electronic device. The processor may determine an electronic device that will be granted a notification signal transmission authority based on the receiving time of the notification signal. For further example, the processor may perform communication connection with the external electronic devices having received the notification signals including the same content through the communication interface, and identify a signal strength of a notification signal received by each external electronic device. The processor may determine an electronic device that will be granted a notification signal transmission authority based on the signal strength of the notification signal.

In operation 1603, the electronic device may determine whether the electronic device has been granted the notification signal transmission authority. For example, when the electronic device has a greater battery level than the external electronic devices having received the notification signals including the same content, the processor may determine that the electronic device has been granted the notification signal transmission authority. For another example, when a signal strength of notification information received by the electronic device is strongest, the processor may determine that the electronic device has been granted the notification signal transmission authority.

In operation 1605, according to an example embodiment, when the electronic device has been granted the notification signal transmission authority, the electronic device may transmit a signal withdrawing the notification signal transmission authority to the external electronic device having received the same content. For example, the processor may transmit the signal withdrawing the notification signal transmission authority to the external electronic device through the communication interface so that the external electronic device having received the same message (e.g., group chatting message) may disregard a message transmitted from the same sender as a sender of the corresponding message during a constant period of time (e.g., 10 minutes). For another example, the processor may transmit the signal withdrawing the notification signal transmission authority to the external electronic devices via the communication interface so that at least one external electronic device among external electronic devices having received the same IoT message may disregard a message received from the same sender as a sender of the corresponding IoT message, until communication connection with the electronic device or an external electronic device for outputting a notification is released.

In operation 1607, when the electronic device has not been granted the notification signal transmission authority, the electronic device may transmit a signal granting the notification signal transmission authority to the external electronic device having received the notification signal including the same content. For example, in order for the external electronic device having received the same message (e.g., group chatting message) to transmit the corresponding message to an external electronic device for outputting a notification, the processor may transmit the signal granting the notification signal transmission authority to the external electronic device via the communication interface.

In operation 1609, the electronic device may disregard the notification signal. For example, the processor may store in the memory 230 without transmitting, to the external electronic device for outputting the notification, a message (e.g., a group chatting message) received from a notification source device (e.g., the electronic device 202 or 204 or the server 206). When a message is received from the same sender as a sender of the disregarded message during a preset time, the processor may store in the memory 230 without transmitting the corresponding message to the external electronic device (e.g., the electronic device 101 of FIG. 1) for outputting the notification. According to an example embodiment, the processor may control at least one of a LED, a speaker, a motor, or a display to output notification information corresponding to a notification signal not transmitted to the external electronic device for outputting the notification.

Figure 17:
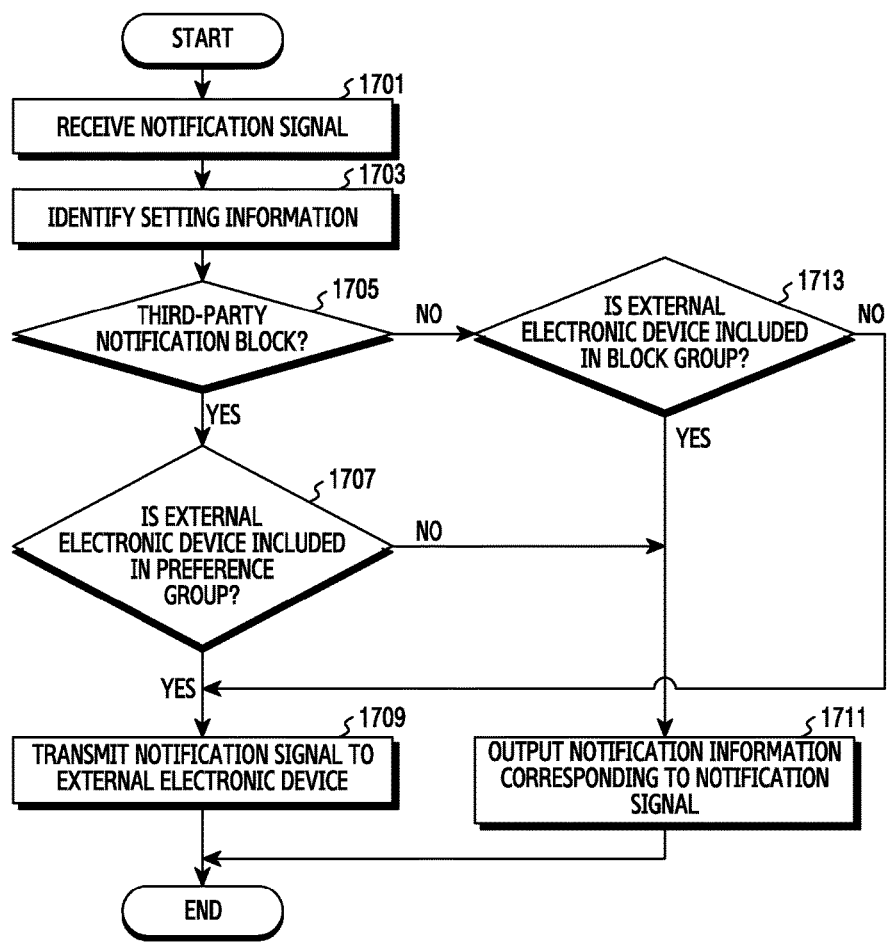
FIG. 17 illustrates a flowchart of another example of transmitting a notification signal to an external electronic device in an electronic device according to various example embodiments.

FIG. 17 illustrates a flowchart of another example of transmitting a notification signal to an external electronic device in an electronic device according to various example embodiments. In the following description, the electronic device may, for example, include at least one of the external electronic device 103, 105 or 107 of FIG. 1, the electronic device 201 of FIG. 2, or the electronic device 301 of FIG. 3.

In operation 1701, the electronic device may receive a notification signal from a notification source device (e.g., the electronic device 202 or 204 or the server 206). For example, a processor (e.g., the processor 220 or 310) of the electronic device (e.g., the electronic device 201 or 301) may receive a SMS message, a chatting message, an advertisement message, an alert message or an IoT message from the notification source device via a communication interface (e.g., the communication interface 270). In response to reception of the notification signal, the processor may check whether the electronic device has been wirelessly connected with an external electronic device (e.g., the electronic device 101) for outputting a notification. When the electronic device has been wirelessly connected with the external electronic device for outputting the notification, the processor may search an external electronic device located around the electronic device.

In operation 1703, the electronic device may identify setting information of the electronic device. For example, the processor may load the setting information of the electronic device from a memory (e.g., the memory 230). Here, the setting information is information used for determining whether to output notification information corresponding to the notification signal, and may be set as a different value every application included in the electronic device.

In operation 1705, the electronic device may determine whether the electronic device has been set as third-party notification block. For example, the processor may determine whether a mode of selectively providing a notification has been activated in the electronic device based on the setting information of the electronic device. When the mode of selectively providing the notification has been activated in the electronic device, the processor may determine that the electronic device has been set as the third-party notification block.

In operation 1707, when the electronic device has been set as the third-party notification block, the electronic device may check whether the external electronic device (e.g., the second external electronic device 105 and/or the third external electronic device 107) located around the electronic device is included in a preference group. For example, the processor may search the external electronic device located around the electronic device based on a response signal responsive to a beacon signal transmitted through the communication interface. The processor may determine whether the searched external electronic device is included in the preference group included in the setting information of the electronic device. Here, the preference group may include a list of a specific external electronic device (e.g., a portable terminal of a family member of a user) which permits transmission of a notification signal to an external electronic device for outputting a notification in a state in which the electronic device has been set as the third-party notification block.

In operation 1709, when the external electronic device located around the electronic device is included in the preference group, the electronic device may transmit the notification signal to the external electronic device (e.g., the electronic device 101 of FIG. 1) for outputting the notification. For example, when the electronic device has been set as the third-party notification block, and has been wirelessly connected with a portable terminal of a family member included in the preference group, the processor may control the communication interface to output the notification signal received from the notification source device, to the external electronic device for outputting the notification. In this case, in response to reception of the notification signal transmitted from the electronic device, the external electronic device for outputting the notification may, for example, change notification setting based on a notification setting value of the electronic device, and output notification information corresponding to the notification signal according to the changed notification setting. Here, the notification signal transmitted to the external electronic device for outputting the notification may include at least a part of device identification information for identifying the electronic device, user identification information for identifying a user of the electronic device, notification identification information for identifying the notification information corresponding to the notification signal, command information for output of the notification information corresponding to the notification signal, supplementary information, and a remark.

In operation 1711, according to an example embodiment, when the external electronic device located around the electronic device is not included in the preference group, the electronic device may output the notification information corresponding to the notification signal. For example, when the external electronic device located around the electronic device is not included in the preference group, the processor may control at least one of a speaker, display or LED to output the notification information corresponding to the notification signal through at least one of a notification sound, LED on/off, a vibration, and a notification screen in the electronic device, without transmitting the notification information to the external electronic device for outputting the notification.

In operation 1713, when the electronic device has not been set as the third-party notification block, the electronic device may determine whether the external electronic device located around the electronic device has been included in a block group. For example, the processor may identify the block group included in the setting information of the electronic device. The processor may identify a list of external electronic devices wirelessly connected with the electronic device. The processor may determine whether the list of external electronic devices wirelessly connected with the electronic device is included in the block group. When the list of external electronic devices wirelessly connected with the electronic device is included in the block group, the processor may perform operation 1711 of outputting the notification information corresponding to the notification signal. When the list of external electronic devices wirelessly connected with the electronic device is not included in the block group, the processor may perform operation 1709 of transmitting the received notification signal to the external electronic device (e.g., the electronic device 101 of FIG. 1) for outputting the notification.

According to an example embodiment, when some of many external electronic devices located around the electronic device are included in the block group, and the others are included in the preference group, the electronic device may give priority to one group. For example, when at least one or more external electronic devices have been included in the block group in operation 1707, the processor may perform operation 1711 irrespective of whether the other external electronic devices have been included in the preference group.

According to various example embodiments, an operation method of an electronic device may include wirelessly connecting with a first external electronic device configured to forward a notification signal from a notification source device and a second external electronic device configured to forward a notification signal from the notification source device, through a wireless communication circuitry, receiving a first notification signal from the first external electronic device through the wireless communication circuitry, receiving a second notification signal from the second external electronic device through the wireless communication circuitry, determining whether the second notification signal has the same content as the first notification signal, providing an audio signal to the speaker based on the first notification signal, and generating, by the speaker, a sound based at least on the audio signal.

According to various example embodiments, the operation method of the electronic device may further include determining whether the second notification signal is received within a selected time after reception of the first notification signal, and only when the second notification signal is received within the selected time after the reception of the first notification signal, determining whether the second notification signal has the same content as the first notification signal.

According to various example embodiments, the operation method of the electronic device may further include disregarding the second notification signal if the second notification signal has the same content as the first notification signal.

According to various example embodiments, the wireless communication circuitry may be configured to support at least one of WiFi or Bluetooth.

According to various example embodiments, wirelessly connecting with a first external electronic device configured to forward a notification signal from a source device through a wireless communication circuitry of the electronic device and a second external electronic device configured to forward a notification signal from the source device may include broadcasting a beacon signal through the wireless communication circuitry, detecting the first external electronic device and the second external electronic device based on a response signal to the beacon signal, and wirelessly connecting with the first external electronic device and the second external electronic device through the wireless communication circuitry.

According to various example embodiments, the operation method of the electronic device may further include identifying state information of the first external electronic device and the second external electronic device, and selecting the first notification signal based on the state information, wherein the state information may include at least one of battery information and/or application running information.

According to various example embodiments, the operation method of the electronic device may further include identifying a signal strength of the first notification signal and a signal strength of the second notification signal, and selecting the first notification signal based on the signal strengths.

According to various example embodiments, the operation method of the electronic device may further include identifying a receiving time of the first notification information and a receiving time of the second notification information, and selecting the first notification signal based on the receiving time.

According to various example embodiments, the operation method of the electronic device may further include transmitting a signal granting a notification signal transmission authority to the first external electronic device through the wireless communication circuitry, and transmitting a signal withdrawing the notification signal transmission authority to the second external electronic device through the wireless communication circuitry.

According to various example embodiments, providing the audio signal to the speaker of the electronic device based on the first notification signal when the second notification signal has the same content as the first notification signal may further include determining whether the second external electronic device satisfies a notification output condition included in setting information of the first external electronic device, and when the second external electronic device satisfies the notification output condition included in the setting information of the first external electronic device, providing an audio signal to the speaker based on the first notification signal.

According to various example embodiments, the electronic device may partly limit setting of a preference group and a block group so that the same external electronic device may not be included in the preference group and the block group. For example, when a user sets, as the block group, an external electronic device (e.g., a portable terminal of a family member) having been set as the preference group, the processor (e.g., the processor 220 or 320) of the electronic device (e.g., the electronic device 201 or 301) may control the speaker or display (e.g., the display 260) to output guidance information for notifying this, without setting the corresponding external electronic device as the block group.

According to various example embodiments, an operation method of an electronic device may include receiving a first notification from a first external electronic device by using a communication circuitry of the electronic device, receiving a second notification from a second external electronic device by using the communication circuitry, determining whether the first notification and the second notification match with each other, and when the first notification and the second notification match with each other, outputting an output signal corresponding to a selected notification among the first notification and the second notification through the output device or an external output device operatively coupled to the electronic device, and disregarding a non-selected notification among the first notification and the second notification.

According to various example embodiments, determining whether the first notification and the second notification match with each other may include checking whether the first notification and the second notification have been transmitted to the first external electronic device and the second external electronic device from the same third external electronic device respectively.

According to various example embodiments, determining whether the first notification and the second notification match with each other may include checking whether the first notification and the second notification have been received by the electronic device within a specified period of time.

According to various example embodiments, determining whether the first notification and the second notification match with each other may include checking whether the first notification and the second notification correspond to the same application (i.e., check whether they are generated by the same application).

According to various example embodiments, the operation method of the electronic device may further include, when the first notification and the second notification do not match with each other, providing a first output signal corresponding to the first notification and a second output signal corresponding to the second notification through the output device or the external output device.

According to various example embodiments, the operation method of the electronic device may further include at least pausing the outputting based at least on first setting information corresponding to the first external electronic device or second setting information corresponding to the second external electronic device.

According to various example embodiments, outputting the output signal through the output device or the external output device operatively coupled to the electronic device may include outputting at least a portion of the output signal as a sound signal.

According to various example embodiments, the output device may include a speaker, and outputting the output signal through the output device or the external output device operatively coupled to the electronic device may include outputting at least a part of the sound signal through the speaker.

According to various example embodiments, outputting the output signal through the output device or the external output device operatively coupled to the electronic device may include outputting at least a portion of the output signal as visual data.

According to various example embodiments, the output device may include a display, and outputting the output signal through the output device or the external output device operatively coupled to the electronic device may include outputting at least a part of the visual data through the display.

According to various example embodiments, the operation method of the electronic device may further include identifying first state information corresponding to the first external electronic device and second state information corresponding to the second external electronic device, and selecting (or determining) the selected notification based at least on the first state information or the second state information.

According to various example embodiments, the operation method of the electronic device may further include identifying strength information of a signal corresponding to a notification, performance information, battery information or application running information, as at least a part of corresponding state information among the first state information and the second state information.

According to various example embodiments, the operation method of the electronic device may further include transmitting a message of requesting to stop notification transmission during at least a specified period of time to an external electronic device having transmitted the non-selected notification to the electronic device among the first external electronic device or the second external electronic device, by using the communication circuitry.

An electronic device and an operation method thereof according to various example embodiments may, when having received a majority of notification signals from at least one external electronic device, selectively output notification information corresponding to the majority of notification signals including repeated content, thereby preventing unnecessary repeated notification.

An electronic device and an operation method thereof according to various example embodiments may, when a notification signal is received from an external electronic device, selectively output a notification based on a list of an external electronic device located around the electronic device, thereby protecting the privacy of a user.

An electronic device and an operation method thereof according to various example embodiments may, when a notification signal is received from an external electronic device, change notification setting to correspond to a notification setting value of the external electronic device and output the same.

The term "module" used in the present document includes a unit consisting of hardware, software or firmware, and may be, for example, used interchangeably with the terms "logic", "logic block", "component", "circuitry", etc. The "module" may be an integrally configured component or the minimum unit performing one or more functions or a part thereof. The "module" may be implemented mechanically or electronically and may, for example, include an application-specific integrated circuit (ASIC) chip, field-programmable gate arrays (FPGAs), or a programmable logic device, which have been known or will be developed in future, performing some operations. At least a part of an apparatus (e.g., modules or functions thereof) or method (e.g., operations) according to various example embodiments may, for example, be implemented as an instruction that has been stored in a computer-readable storage media in the form of a program module. When the instruction is executed by a processor (e.g., the processor 220 or 310), the processor may perform a function corresponding to the instruction.

The computer-readable recording media may include a hard disk, a floppy disk, a magnetic media (e.g., a magnetic tape), an optical recording media (e.g., a compact disk-read only memory (CD-ROM) and/or a digital versatile disk (DVD)), a magneto-optical media (e.g., a floptical disk), an internal memory, etc. The instruction may include a code made by a compiler or a code executable by an interpreter. The module or program module according to various example embodiments may further include at least one or more of the aforementioned constituent elements, or omit a part thereof, or further include another constituent element. Operations carried out by the module, the program module or the another constituent element according to various example embodiments may be executed in a sequential, parallel, repeated or heuristic manner, or at least some operations may be executed in different order or may be omitted, or another operation may be added.

What is claimed is:

1. An electronic device comprising:
   a housing;
   a speaker of which at least part is located inside the housing;
   a wireless communication circuitry located inside the housing, and configured to provide a radio range covering at least part of an audible distance of a sound outputted from the speaker;
   a processor located inside the housing, and electrically connected with the wireless communication circuitry; and
   a memory located inside the housing, and electrically connected with the processor,
   wherein the memory stores instructions that, when executed, cause the processor to:
   wirelessly connect with each of a first external electronic device and a second external electronic device
   receive a first notification signal from the first external electronic device through the wireless communication circuitry,
   receive a second notification signal from the second external electronic device through the wireless communication circuitry,
   determine whether the second notification signal has the same content as the first notification signal,
   provide an audio signal to the speaker based on the first notification signal, and generate, by the speaker, a sound based at least on the audio signal.

2. The electronic device of claim 1, wherein the instructions enable the processor to:
determine whether the second notification signal is received within a selected time after reception of the first notification signal, and
only when the second notification signal is received within the selected time after the reception of the first notification signal, determine whether the second notification signal has the same content as the first notification signal.

3. The electronic device of claim 2, wherein the instructions enable the processor to:
disregard the second notification signal if the second notification signal has the same content as the first notification signal.

4. The electronic device of claim 1, wherein the instructions enable the processor to:
select the first notification signal based on at least one of state information of an external electronic device, a signal strength of a notification signal, and a receiving time of the notification signal,
wherein the state information comprises at least one of battery information, performance information, and/or application running information.

5. The electronic device of claim 1, wherein the instructions enable the processor to:
determine whether the second external electronic device satisfies a notification output condition comprised in setting information of the first external electronic device, and
when the second external electronic device satisfies the notification output condition comprised in the setting information of the first external electronic device, provide an audio signal to the speaker based on the first notification signal.

6. An electronic device comprising:
an output device;
a communication circuitry; and
a processor,
wherein the processor is configured to:
receive a first notification from a first external electronic device via the communication circuitry,
receive a second notification from a second external electronic device via the communication circuitry,
determine whether the first notification and the second notification match with each other, and
when the first notification and the second notification match with each other, output an output signal corresponding to a selected notification among the first notification and the second notification through the output device and/or an external output device operatively coupled to the electronic device, and disregard a non-selected notification among the first notification and the second notification.

7. The electronic device of claim 6, wherein the processor is configured to check whether the first notification and the second notification have been transmitted to the first external electronic device and the second external electronic device from the same third external electronic device respectively, as at least a part of being configured to determine whether the first notification and the second notification match with each other.

8. The electronic device of claim 6, wherein the processor is configured to check whether the first notification and the second notification have been received by the electronic device within a specified period of time, as at least a part of being configured to determine whether the first notification and the second notification match with each other.

9. The electronic device of claim 6, wherein the processor is configured to check whether the first notification and the second notification correspond to the same application, as at least a part of being configured to determine whether the first notification and the second notification match with each other.

10. The electronic device of claim 6, wherein the processor is configured to, when the first notification and the second notification do not match with each other, provide a first output signal corresponding to the first notification and a second output signal corresponding to the second notification through the output device and/or the external output device.

11. The electronic device of claim 6, further comprising a memory for storing first setting information corresponding to the first external electronic device and/or second setting information corresponding to the second external electronic device,
wherein the processor is configured to at least pause the output signal based at least on the first setting information and/or the second setting information.

12. The electronic device of claim 6, wherein the processor is configured to output, as a sound signal, at least a portion of the output signal, as at least a part of the output signal.

13. The electronic device of claim 12, wherein the output device comprises a speaker, and
the processor is configured to output at least a part of the sound signal through the speaker, as at least a part of the output signal.

14. The electronic device of claim 6, wherein the processor is configured to output, as visual data, at least a portion of the output signal, as at least a part of the output signal.

15. The electronic device of claim 14, wherein the output device comprises a display, and
the processor is configured to output at least a part of the visual data through the display, as at least a part of the ouput signal.

16. The electronic device of claim 6, wherein the processor is configured to:
identify first state information corresponding to the first external electronic device and second state information corresponding to the second external electronic device, and
select the selected notification based at least on the first state information and/or the second state information.

17. The electronic device of claim 16, wherein the processor is configured to:
identify strength information of a signal corresponding to a notification, performance information, battery information and/or application running information, as at least a part of corresponding state information among the first state information and the second state information.

18. The electronic device of claim 6, wherein the processor is configured to:
transmit a message comprising requesting to stop notification transmission during at least a specified period of time to an external electronic device having transmitted the non-selected notification to the electronic device among the first external electronic device or the second external electronic device, via the communication circuitry.

19. A non-transitory computer-readable recording medium in an electronic device, recording a program for executing:
- receiving a first notification from a first external electronic device via communication circuitry of the electronic device;
- receiving a second notification from a second external electronic device via the communication circuitry;
- determining whether the first notification and the second notification match with each other; and
- when the first notification and the second notification match with each other, outputting an output signal corresponding to a selected notification among the first notification and the second notification through an output device of the electronic device and/or an external output device operatively coupled to the electronic device, and disregarding a non-selected notification among the first notification and the second notification.

20. The non-transitory computer-readable recording medium of claim 19, wherein the recording medium records a program for, when the first notification and the second notification do not match with each other, providing a first output signal corresponding to the first notification and a second output signal corresponding to the second notification through the output device and/or the external output device.

* * * * *